United States Patent
Plaisted et al.

(10) Patent No.: US 8,386,197 B1
(45) Date of Patent: Feb. 26, 2013

(54) METHOD AND SYSTEM FOR PROCESSING INFORMATION FROM A COMBINATION OF A SOLAR THERMAL SYSTEM AND A PHOTOVOLTAIC APPARATUS

(75) Inventors: Joshua Reed Plaisted, Oakland, CA (US); John J. Dyreby, Berkeley, CA (US)

(73) Assignee: EchoFirst, Inc., Fremont, CA (US)

( * ) Notice: Subject to any disclaimer, the term of this patent is extended or adjusted under 35 U.S.C. 154(b) by 438 days.

(21) Appl. No.: 12/684,788

(22) Filed: Jan. 8, 2010

Related U.S. Application Data

(60) Provisional application No. 61/143,396, filed on Jan. 8, 2009.

(51) Int. Cl.
*G01R 31/00* (2006.01)
(52) U.S. Cl. .......................................................... 702/58
(58) Field of Classification Search ..................... 702/58
See application file for complete search history.

(56) References Cited

U.S. PATENT DOCUMENTS

| | | | |
|---|---|---|---|
| 2006/0118163 A1 | 6/2006 | Plaisted et al. | |
| 2009/0316361 A1* | 12/2009 | Simon | 361/699 |
| 2010/0219983 A1* | 9/2010 | Peleg et al. | 340/870.17 |

* cited by examiner

Primary Examiner — Aditya Bhat
(74) Attorney, Agent, or Firm — Richard T. Ogawa; Ogawa P.C.

(57) ABSTRACT

A method for operating a solar thermal system. The method includes providing a photovoltaic apparatus coupled to a solar thermal apparatus. In a preferred embodiment, the solar thermal apparatus comprises flow region having a first measurement region and a second measurement region. The first measurement region is configured by a spatial distance to the second measurement region according to one or more embodiments. The present method also includes receiving electrical information associated with operation of the photovoltaic apparatus and receiving thermal information associated with operation of the solar thermal apparatus. In a specific embodiment, the thermal information is derived from the first measurement region and the second measurement region. The method also includes processing the electrical information and associating the electrical information against one or more electrical parameters and processing the thermal information and associating the thermal information against one or more thermal parameters. In a preferred embodiment, the method associates the one or more thermal parameters with the one or more electrical parameters to determine a state (e.g., failure, working, maintenance) of the solar thermal apparatus.

21 Claims, 19 Drawing Sheets

METHOD AND SYSTEM FOR PROCESSING INFORMATION FROM A COMBINATION OF A SOLAR THERMAL SYSTEM AND A PHOTOVOLTAIC APPARATUS

CROSS-REFERENCES TO RELATED APPLICATIONS

This application claims priority to U.S. Provisional Patent Application No. 61/143,396, filed on Jan. 8, 2009, commonly assigned and incorporated by reference for all purpose herein.

BACKGROUND OF THE INVENTION

The present invention relates to operation of a solar thermal system. More particularly, the present invention provides a method and system for operating a solar thermal system including one or more parameters that are validated against one or more parameters from one or more independent sources, although they can also be dependent sources. The one or more independent sources include an operational photovoltaic system, which is coupled to the solar thermal system or is decoupled from the solar thermal system at another geographic location. In alternative embodiments, the sources can include information associated with irradiation from a "clear sky" day or the like. In still alternative embodiments, the one or more sources can be combined with any of the above and the like. Merely, by way of example, the present invention has been applied to a solar thermal module configured on a building structure, but it would be recognized that the invention has a much broader range of applications.

Over the past centuries, the world population of human beings has exploded. Along with the population, demand for resources has also grown explosively. Such resources include raw materials such as wood, iron, and copper and energy, such as fossil fuels, including coal and oil. Industrial countries worldwide project more increases in oil consumption for transportation and heating purposes from developing nations such as China and India. Obviously, our daily lives depend, for the most part, upon oil or other forms of fossil fuel, which are becoming scarce as it becomes depleted.

Along with the depletion of our fossil fuel resources, our planet has experienced a global warming phenomena, known as "global warming," and brought to our foremost attention by our former Vice President Al Gore. Global warming is known as an increase in an average temperature of the Earth's air near its surface, which is projected to continue at a rapid pace. Warming is believed to be caused by greenhouse cases, which are derived, in part, from use of fossil fuels. The increase in temperature is expected to cause extreme weather conditions and a drastic size reduction of the polar ice caps, which in turn will lead to higher sea levels and an increase in the rate of warming. Ultimately, other effects include mass species extinctions, and possibly other uncertainties that may be detrimental to human beings.

Much if not all of the useful energy found on the Earth comes from our sun. Generally all common plant life on the Earth achieves life using photosynthesis processes from sun light. Fossil fuels such as oil were also developed from biological materials derived from energy associated with the sun. For life on the planet Earth, the sun has been our most important energy source and fuel for modern day solar energy. Solar energy possesses many characteristics that are very desirable! Solar energy is renewable, clean, abundant, and often widespread.

As an example, solar panels have been developed to convert sunlight into energy. As merely an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successful for certain applications, there are still certain limitations. Solar cells are often costly. Depending upon the geographic region, there are often financial subsidies from governmental entities for purchasing solar panels, which often cannot compete with the direct purchase of electricity from public power companies. Additionally, the panels are often composed of silicon bearing wafer materials. Such wafer materials are often costly and difficult to manufacture efficiently on a large scale. Availability of solar panels is also somewhat scarce. That is, solar panels are often difficult to find and purchase from limited sources of photovoltaic silicon bearing materials. Moreover, conventional solar systems are also difficult to maintain and monitor for operational accuracy. Once a solar system has been installed, there is simply no easy way to monitor the accuracy of energy generation. These and other limitations are described throughout the present specification, and may be described in more detail below.

From the above, it is seen that techniques for improving operation of a solar system are highly desired.

BRIEF SUMMARY OF THE INVENTION

According to the present invention, techniques related to the operation of a solar thermal system are provided. More particularly, the present invention provides a method and system for operating a solar thermal system including one or more parameters that are validated against one or more parameters from one or more independent sources, although they can also be dependent sources. The one or more independent sources include an operational photovoltaic system, which is coupled to the solar thermal system or is decoupled from the solar thermal system at another geographic location. In alternative embodiments, the sources can include information associated with irradiation from a "clear sky" day or the like. In still alternative embodiments, the one or more sources can be combined with any of the above and the like. Merely, by way of example, the present invention has been applied to a solar thermal module configured on a building structure, but it would be recognized that the invention has a much broader range of applications.

In a specific embodiment, the present invention provides a method for operating a solar thermal system to, for example, determine whether it is operating correctly. The method includes providing a photovoltaic apparatus comprising a first electrical member and a second electrical member, e.g., first bus bar and second bus bar. The method includes providing a solar thermal apparatus coupled to the photovoltaic apparatus. In a specific embodiment, the solar thermal apparatus comprises a flow region (e.g., fluid flow plenum) having a first measurement region and a second measurement region. In a specific embodiment, the first measurement region is configured by a spatial distance to the second measurement region. The method includes capturing electrical information (e.g., voltage, current, resistivity) associated with operation of the photovoltaic apparatus. In a preferred embodiment, the electrical information is derived from the first electrical member and the second electrical member. Alternatively, the electrical information can also be derived from a temperature, a magnetic field, a varying material property, or the like. The method also includes capturing thermal information associated with operation of the solar thermal apparatus. Preferably, the thermal information is derived from the first measurement region and the second measurement region. The method includes processing the electrical information and associating the electrical information against one or more parameters and processing the thermal information and associating the thermal information against one or more parameters. In a preferred embodiment, the method also includes validating the electrical information against the one or more electrical parameters and validating the thermal information against the one or more thermal parameters.

In an alternative specific embodiment, the present invention provides an alternative method for operating a solar thermal system. The method includes providing a photovoltaic apparatus coupled to a solar thermal apparatus. In a preferred embodiment, the solar thermal apparatus comprises a flow region having a first measurement region and a second measurement region. The first measurement region is configured by a spatial distance to the second measurement region according to one or more embodiments. The present method also includes receiving electrical information associated with operation of the photovoltaic apparatus and receiving thermal information associated with operation of the solar thermal apparatus. In a specific embodiment, the thermal information is derived from the first measurement region and the second measurement region. The method also includes processing the electrical information and associating the electrical information against one or more electrical parameters and processing the thermal information and associating the thermal information against one or more thermal parameters. In a preferred embodiment, the method associates the one or more thermal parameters with the one or more electrical parameters to determine a state (e.g., failure, working, maintenance) of the solar thermal apparatus.

In a specific embodiment, the present invention provides a method for operating a solar thermal system. The method includes providing a photovoltaic apparatus comprising a first electrical member and a second electrical member in a first geographic location, such as a roof top setting on a building structure. The method includes providing a solar thermal apparatus at a second geographic location, which is different from the first geographic location. The solar thermal apparatus comprises a flow region having a first measurement region and a second measurement region. The first measurement region is configured by a spatial distance to the second measurement region. The method includes capturing electrical information associated with operation of the photovoltaic apparatus. The method includes capturing thermal information associated with operation of the solar thermal apparatus. The method also includes processing the electrical information and associating the electrical information against one or more electrical parameters and processing the thermal information and associating the thermal information against one or more thermal parameters. The method also validates the electrical information against the one or more electrical parameters and validates the thermal information against the one or more thermal parameters.

Many benefits are achieved by way of the present invention over conventional techniques. For example, the present technique provides an easy to use process that relies upon conventional technologies such as solar thermal modules and photovoltaic modules, although other elements can also be used. Additionally, the method provides a process that is compatible with the instant solar thermal system without substantial modifications to equipment and processes. Preferably, the invention provides for an improved solar module operation procedure, which is less costly and easy to handle. In a preferred embodiment, the present solar thermal system can be monitored for failure, reliability, and/or other working disorders, and the like. In a specific embodiment, the solar module system and operation can be configured using computer software from a controller or other processing device. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques related to the operation of a solar thermal system are provided. More particularly, the present invention provides a method and system for operating a solar thermal system including one or more parameters that are validated against one or more parameters from one or more independent sources, although they can also be dependent sources. The one or more independent sources include an operational photovoltaic system, which is coupled to the solar thermal system or is decoupled from the solar thermal system at another geographic location. In alternative embodiments, the sources can include information associated with irradiation from a "clear sky" day or the like. In still alternative embodiments, the one or more sources can be combined with any of the above and the like. Among multiple embodiments described, a method of electrical and thermal data validation is provided that can confirm operative state and working efficiency of the solar thermal system based on comparisons to electrical and thermal parameters. Merely, by way of example, the present invention has been applied to a solar thermal module configured on a building structure, but it would be recognized that the invention has a much broader range of applications.

Figure 1A:
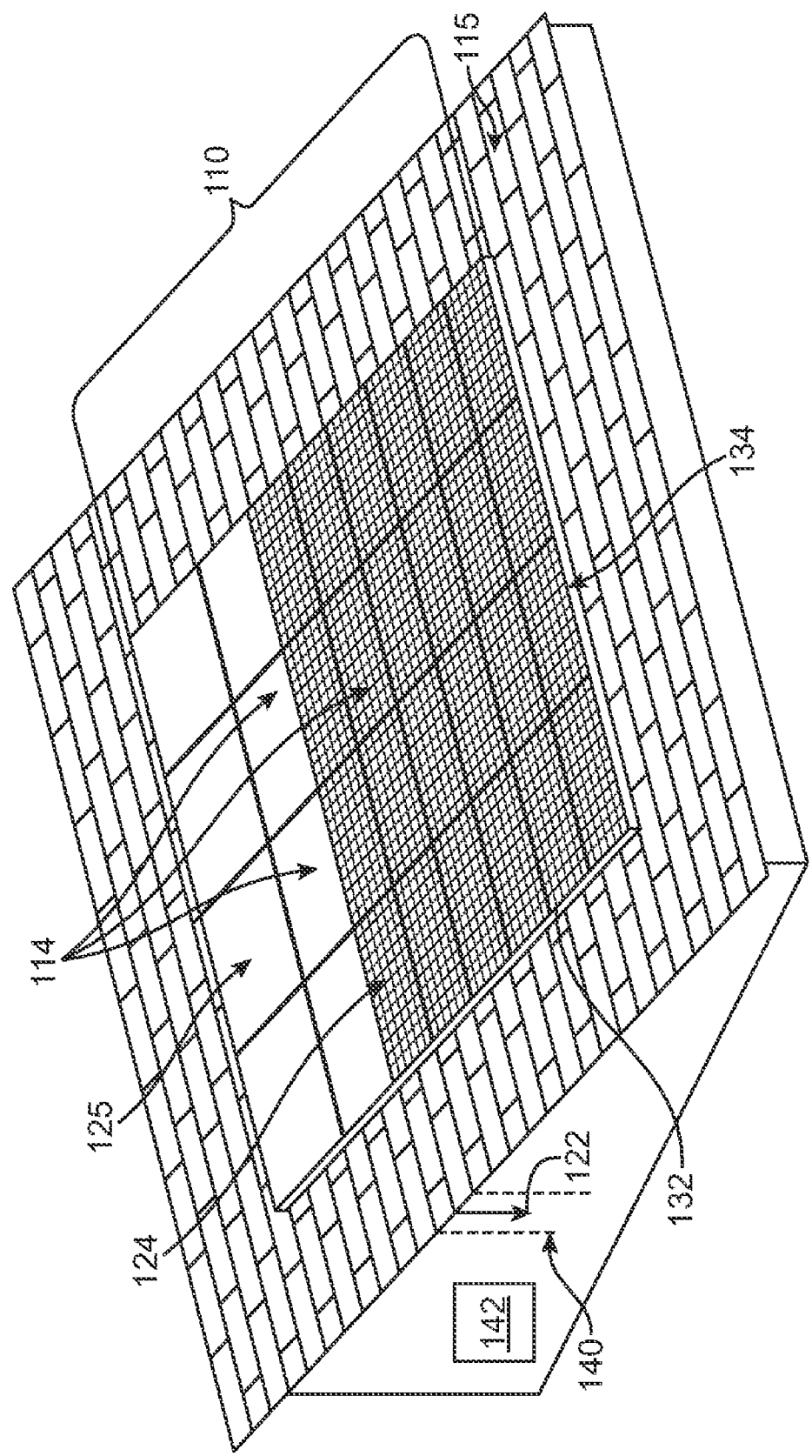
FIG. 1A is a simplified perspective view diagram of a solar thermal system according to an embodiment of the present invention.

FIG. 1A is a simplified perspective view diagram of a solar system according to an embodiment of the present invention. This diagram is merely an example, which should not unduly limit the scope of the claims herein. One of ordinary skill in the art would recognize other variations, modifications, and alternatives. As shown, the rack assembly 110, which is installed, that supports a set of solar modules 114 over an underlying body 115. The rack assembly 110 may be structured and adapted to include features such as described with one or more embodiments of the invention. The underlying body 115 may correspond to, for example, a rooftop or roof structure of a building or dwelling. In general, the underlying body 115 may correspond to any area, surface or platform that can receive sunlight and be connected to a building, place or location that can use the solar energy.

Figure 1B:
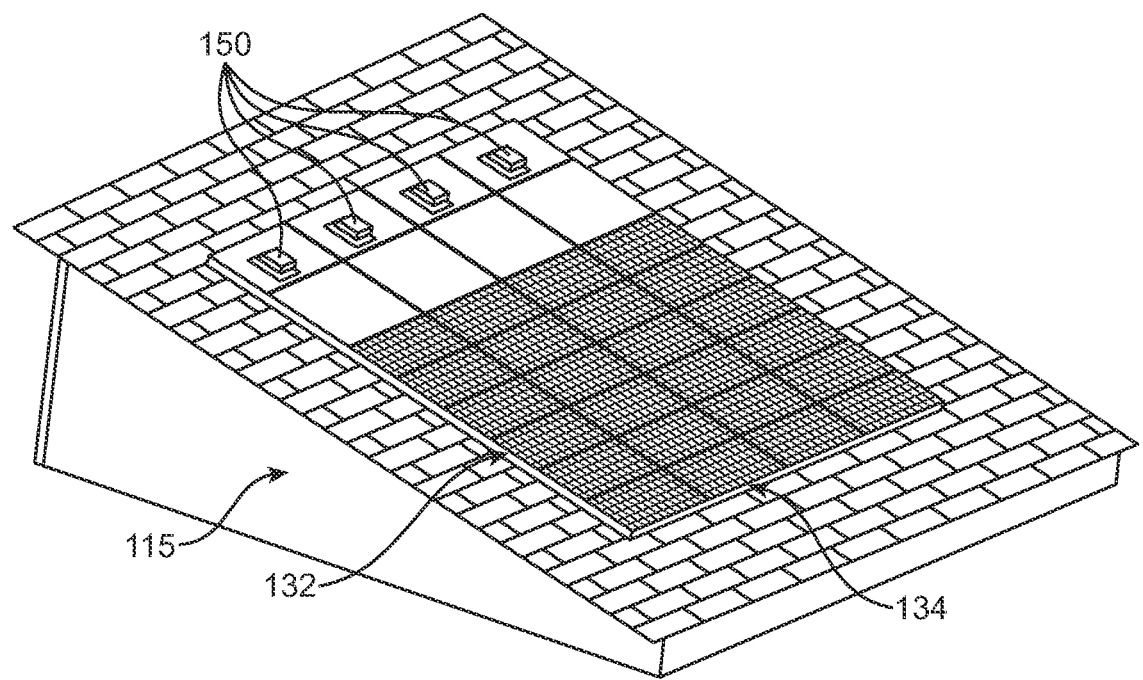
FIG. 1B is a simplified perspective view diagram of a solar thermal system according to an alternative embodiment of the present invention.

Embodiments of the invention contemplate that different types of solar modules 114 may be employed in various implementations and context. For example, as shown by the simplified diagram of FIG. 1B, the solar modules 114 include photovoltaic modules 124 and thermal modules 125. Under one or more embodiments, the perimeter may include one or more sealed lengths 132 and an open length 134 from which air from the environment is drawn. As will be described, channels (not shown) may be provided between the rack assembly 110 and underlying body 115 for purpose of constraining airflow. Air drivers (not show) may drive (e.g. push or pull) air within the formed channels. The solar modules 114 generate heat, either through design or as an inherent by-product. According to one or more embodiments, this heat warms the air as it is drawn from the environment and pulled through the channels formed underneath the solar modules 114.

Numerous alternatives and variations are contemplated. For example, all of the perimeter of the rack assembly 110 may be sealed, and air may drawn from within a dwelling on which the rack assembly 110 is provided. This air may be pushed through channels, then back into the dwelling when warmed. Alternatively, some or all of the open length 134 may be sealed, or conversely, portions of the sealed lengths 132 may be opened or perforated as part of an underlying channel system. As shown, FIG. 1A illustrates an implementation in which heated air is directed into a duct 140 within a structure of the underlying body 115. For example, warm air may heat a dwelling on which the rack assembly 110 is installed, and the duct 140 enables the heated air to flow into the circulation system of the dwelling. As mentioned, the solar modules 114 may be formed by a combination of the photovoltaic modules 124 and the thermal modules 125. The photovoltaic modules 124 can generate some residual heat when receiving solar energy and converting the solar energy into electrical current. In contrast, the thermal modules 125 may directly convert the solar energy into heat at a higher efficiency. The use and number of thermal modules 125 may depend on the use of the heated airflow, as well as the environment where the rack assembly 110 is installed. For example, when the purpose of heating air in the channels is to supply warm air to a dwelling of the underlying body 115, the thermal modules 125 have more use in colder environments, while warm environments may require only use of photovoltaic modules 124. Even in cold environments, thermal modules 125 may be used to convert solar energy into hot air due to the high operating efficiency achieved by their designs, and additional components may be used to drive the hot air into the dwelling.

Referring again to FIG. 1B, multiple ventilation outlets 150 may be employed for directing heated air from under the rack assembly. As such, the ventilation outlets are located underneath the thermal modules 125. As shown with FIG. 1A, the open length 134 of the perimeter is provided on one side, and the series of vents 150 are provided lengthwise on the other side of the perimeter formed by the rack assembly 110. For example, the vents 150 may guide the directed heated air inward into the structure of the underlying body 115. Of course, there can be other variations, modifications, and alternatives. As merely an example, further details of the rack assembly can be found in United States Patent Application Publication 20060118163 A1 in the names of Joshua Reed Plaisted et al., commonly assigned, and hereby incorporated by reference herein. Of course, there can be other variations, modifications, and alternatives. Further details of the shaped structure underlying the solar array are described throughout the present specification and more particularly below.

Figure 2:
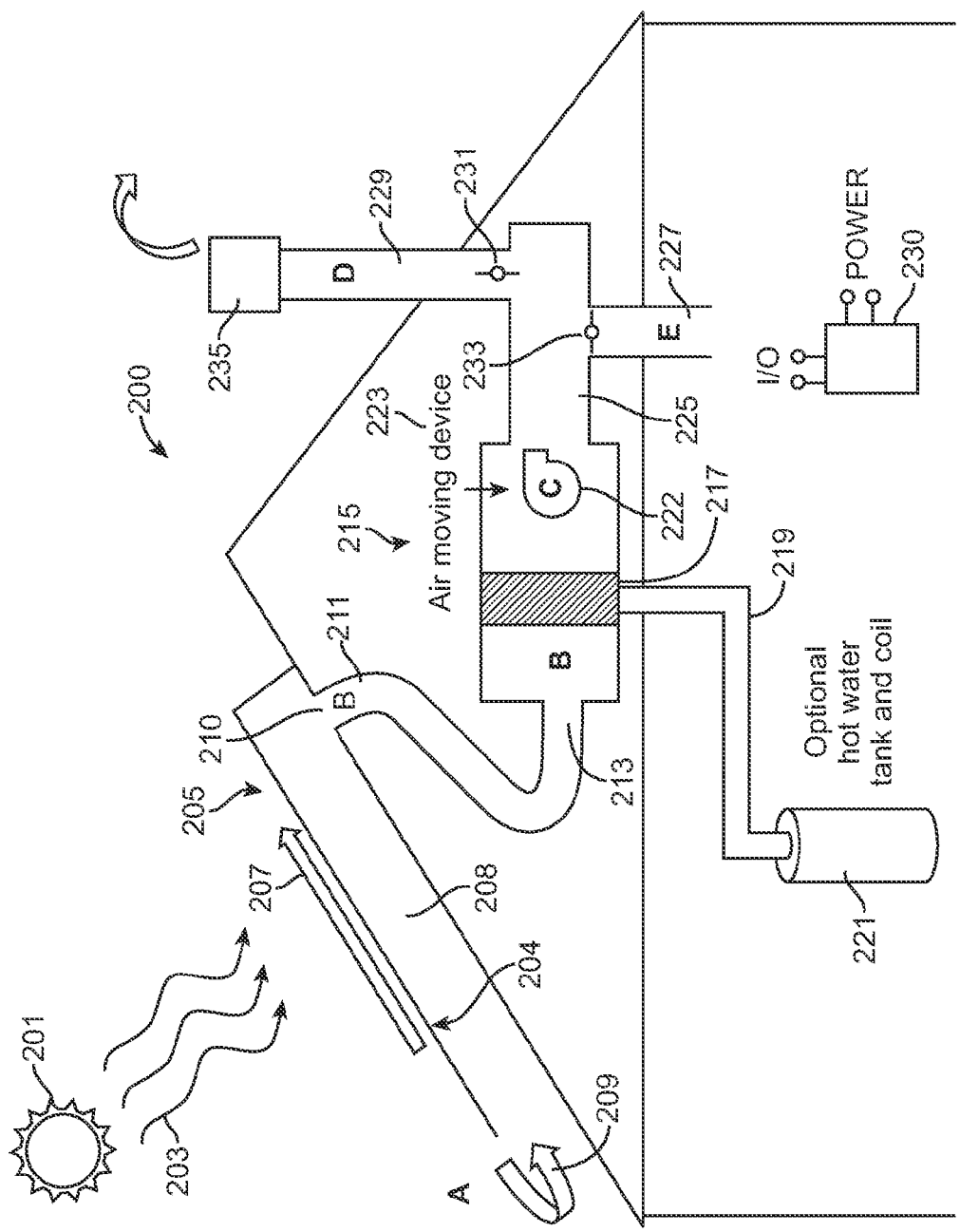
FIG. 2 is a simplified diagram of a solar thermal system implemented at a target location according to an embodiment of the present invention.

FIG. 2 is a simplified diagram of a solar thermal system implemented at a target location according to an embodiment of the present invention. This diagram is merely an example, which should not unduly limit the scope of the claims herein. One of ordinary skill in the art would recognize other variations, modifications, and alternatives. As shown, the solar thermal system 200 includes a plurality of thermal modules spatially configured as an N by M array, where N is an integer greater than 1, and M is an integer greater than 2 spatially disposed and attached to a building structure, such as a roof, building side, rack, or the like. In a specific embodiment, the plurality of thermal modules is configured to form an aperture region 205 and a backside region 204. In one or more embodiments, the solar thermal modules can be combined with photovoltaic modules or solely thermal modules or photovoltaic modules configured for thermal use to provide a heat source. Of course, there can be other variations, modifications, and alternatives.

In a specific embodiment, electromagnetic radiation 203 from the sun or other radiation source illuminates on the aperture region. In one or more embodiments, thermal energy is transferred through the solar module and applies the thermal energy to a working fluid 209 such as air, which traverses 207 in an upward direction through an air plenum 208 configured from at least the backside region. In a specific embodiment, the air plenum has one or more intake regions and one or more exhaust regions 210. In a specific embodiment, the one or more intake regions can be configured near a lower portion of the solar module array, although there can be other spatial locations. Additionally, the one or more exhaust regions can be a single exhaust region or multiple exhaust regions disposed spatially in a configuration near an upper portion of the solar module array. Of course, there can be other variations, modifications, and alternatives.

In a specific embodiment, the present system includes a shaped structure or thickness of material coupled to the backside region to form the plenum. In a specific embodiment, the shaped structure is integrally configured with the rack structure or disposed underlying the various components of the solar module or thermal array. In a specific embodiment, the shaped structure or thickness of material can be the pan structure coupled to the backside region. In a preferred embodiment, the shaped structure has a suitable thickness to prevent moisture from penetrating into the plenum region, but can also be vented according to one or more embodiments. Of course, there can be other variations, modifications, and alternatives.

Referring again to FIG. 2, the system has a first duct 210 coupled to the one or more exhaust regions 210. In a specific embodiment, the first duct can couple into a fluid flow region 215 having a fluid flow intake region 213 coupled to the first duct region, a fluid flow exit region 225, and an fluid drive region 223 spatially disposed between the fluid flow intake region and the fluid flow exit region. As used herein, the terms "fluid exit region" "fluid flow intake region" "fluid drive region" and others are not intended to be limiting and should be interpreted by ordinary meaning. Also shown are valves or dampers 231 233 which respectively connect to air pathways 229 and 233 to an outside region via exhaust 235 or back into a building structure via exhaust 227. Of course, there can be other variations, modifications, and alternatives.

In a specific embodiment, the system has an air moving device 222 comprising a drive device coupled to a blower device. In a preferred embodiment, the drive device is spatially disposed within the fluid drive region. In a specific embodiment, the drive device comprises an electric motor. In a preferred embodiment, the blower device comprises a fan device having a centrifugal configuration operably coupled to the drive device. Such blower device comprises a plurality of blades, which are configured to move high volumes of fluid and in particular air through the plenum. As shown, the drive device is disposed within a plenum region for fluid flow according to a specific embodiment. In a preferred embodiment, the fluid flow comprises air flow ranging in temperature from about 32 Degrees Fahrenheit to about 200 Degrees Fahrenheit based upon the temperature insulation rating of the drive device, which is spatially disposed within the air flow region.

In a specific embodiment, the system has one or more sensing device coupled to the controller device. In one or more embodiments, the controller device is coupled to one or more sensor devices operably coupled to the drive device. The one or more sensing devices are disposed spatially within a vicinity of the drive device according to a specific embodiment. In a specific embodiment, the sensing devices can be a thermocouple or other sensing device capable of receiving information that is indicative of temperature of the drive device. Of course, there are other variations, modifications, and alternatives.

In a specific embodiment, the system also has a controller 230 operably coupled to the air moving device. In a specific embodiment, the controller includes input/output for power, input/output for sensing devices; and input/output for control and/or feedback. As an example, the controller can be a computing system, including microprocessor device, memory, and input/output drivers and the like. Of course, there can be other variations, modifications, and alternatives.

Referring again to FIG. 2, the system has a second duct 225 coupled to the fluid flow exit region. As shown, the system can also include a heat exchanger 217 spatially disposed between the one or more exhaust regions and the air moving device to capture thermal energy in an efficient manner, while also reducing the temperature of fluid flow before it traverses over the drive device according to a specific embodiment. As shown, the heat exchanger couples to piping 219, which preheats water for the hot water tank 221 or other heating apparatus. Further details of the present system and related methods can be found throughout the present specification and more particularly below. A detailed description of the controller and solar thermal module are described more particularly below.

Figure 3:
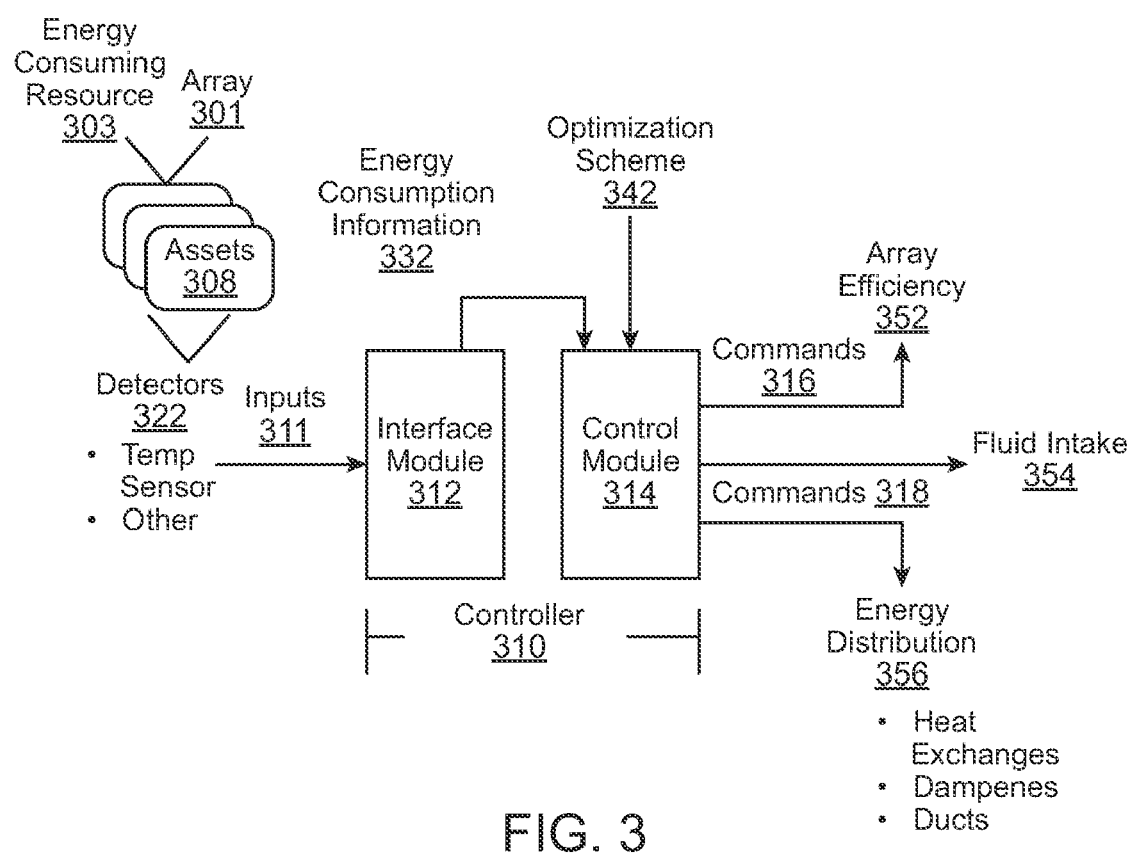
FIG. 3 is a simplified diagram of a controller for controlling a solar thermal system and its usage at a target location according to an embodiment of the present invention.

FIG. 3 is a simplified schematic diagram of a controller configured on the solar thermal system according to an embodiment of the present invention. This diagram is merely an example, which should not unduly limit the scope of the claims herein. One of ordinary skill in the art would recognize other variations, modifications, and alternatives. In a specific embodiment, a controller controls a solar module array and its usage at a target location, according to one or more embodiments of the invention. In a specific embodiment, a controller may be provided in connection with installation and use of a solar thermal system, such as shown and described in FIG. 1. The controller may be used in connection with a hybrid array, in which one or more solar modules of the solar thermal system serve the purpose of being a thermal generator. Embodiments such as described in FIG. 1 provide for a passage of fluid in proximity to an underside of the solar thermal system, for the purpose of cooling individual modules that comprise the system while collecting thermal energy as an output from the system. For example, air or other fluids may be directed in ducts or confined (or semi-confined) spaces just underneath the array so as to heat up from the operating temperature of individual modules in the system.

As will be described, the target location where controller 310 and the corresponding solar thermal system may be installed or implemented may correspond to a building, a home or dwelling, or other structure where electricity and/or heat is used. In a specific embodiment, a controller 310 is formed from components that include an interface module 312 and a control module 314. The interface module 312 may receive inputs from various remote and local sources regarding the energy consumption of different assets 308 within the target location. In other embodiments described herein, a remote and local bus is described for such sources.

The assets 308 include energy generating assets 301 and energy consuming assets 303 (or "loads"). Energy generating assets include thermal and electrical variety, and encompass the solar thermal system. Energy consuming assets remove energy (thermal or electrical) from the fluid (e.g. air steam). Energy consuming thermal assets may correspond to, for example, spaces where heating is provided, or sources of water that are heated (e. domestic hot water or swimming pool) or thermal mass components. Energy consuming electrical assets may correspond to, for example, systems that consume electrical energy (DC or AC).

In a specific embodiment, controller 310 receives input data 311 from detectors 322. The detectors 322 correspond to any equipment that ascertains the energy needs or consumption of the assets 308. These may include, for example, temperature sensors, pressure sensors, gauges, meters and other equipment. As described with other embodiments, a local bus may connect the controller 310 to the detectors to receive the input data 314. In another specific embodiment, the input data 311 is received in real-time, or as feedback to control implementations.

The interface module 312 may communicate energy consumption information 332 to the control module 314. The control module 314 may be equipped with programming or other logic to implement commands 316, 318, or other controls. In a specific embodiment, the commands 316 or 318 may include device commands, and thus, may take form in mechanical transformation or action.

In a specific embodiment, the control module 314 uses the energy consumption information 332 in controlling devices that affect the efficiency of the solar thermal system. These devices may include, for example, a blower or other mechanism 352 that directs air flow underneath the modules of the array. For example, the blower may accelerate or decelerate airflow (or other fluid flow) under the solar thermal system. As an alternative or addition, the devices that effect the efficiency of the solar thermal system may include electromechanical control of fluid speed (assuming fluid may be something other than air), or ventilation input (fluid is air). In a specific embodiment, the control module 314 determines a range of efficiency for operation of the system based in part on the energy consumption information 332.

As an alternative or addition to affecting the efficiency of the solar thermal system, one or more embodiments may provide that the control module 314 controls the intake 354 of thermal output from the system. In a specific embodiment, the solar thermal system heats fluid through a combination of photovoltaic and thermal modules. The rate and manner in which the heated fluid (e.g. hot air) is taken into an energy distribution system of the target location may be affected by the control module 314, based in part on determinations made from the energy consumption information 332.

Still further, the control module 314 may configure the manner in which energy (both thermal and electrical) is distributed through the system of the target location. In particular, one or more embodiments provide that the control module 314 selects amongst energy consuming assets to service in a given duration with either heat or electrical output. The selection may optionally be based on one or more optimization schemes 342, as well as other criteria such as usage rules. The usage rules may dictate, for example, common sense measures, such as avoid heating the pool on cold days, or save high-electrical loads for non-peak hours. The usage rules may also dictate preferences or other measures that are known to accommodate a specific goal. In more detail, the optimization scheme 342 may also be in the form of rules, but factor a primary goal or set of goals as criteria. In a specific embodiment, the optimization scheme 342 may factor cost-saving criteria, so as to minimize the cost of energy consumption at the target location. As such, the optimization scheme 342 may factor in, for example, what assets 308 are services at a given time of the day based on the amount of irradiance that is present or expected, as compared to the cost of using energy from a utility source in that same period.

In order to implement the optimization scheme 342 and various rules as to how energy (thermal or electrical) is distributed, one or more embodiments provide that the control module 314 has access and control of energy distribution equipment 356. These may include, for example, heat exchanges that receive heated fluid and consume heat there from, ducts, dampers, and blowers/fans for moving air or other fluids. Such controls may be provided as an alternative or addition to the control of components that, for example, push or otherwise direct airflow under the solar thermal system.

In a specific embodiment, the controller 310, or portions thereof, is implemented in the form of a dedicated device that is mounted or otherwise placed in position to receive on-site electrical consumption information 332. Thus, for example, the controller 310 may be implemented in the form of a box, through hardware, firmware or software that directly communicates with, for example, temperature sensors and other equipment. In another specific embodiment, however, the controller 310 may be implemented on a computer, such as on a personal computer (desktop machine, laptop, small-form factor device, etc.) or a microcontroller. Still further, the controller 310 may be distributed, in that logic comprising the controller 310 or its modules may be distributed over multiple machines or devices, and/or at multiple locations.

Figure 4:
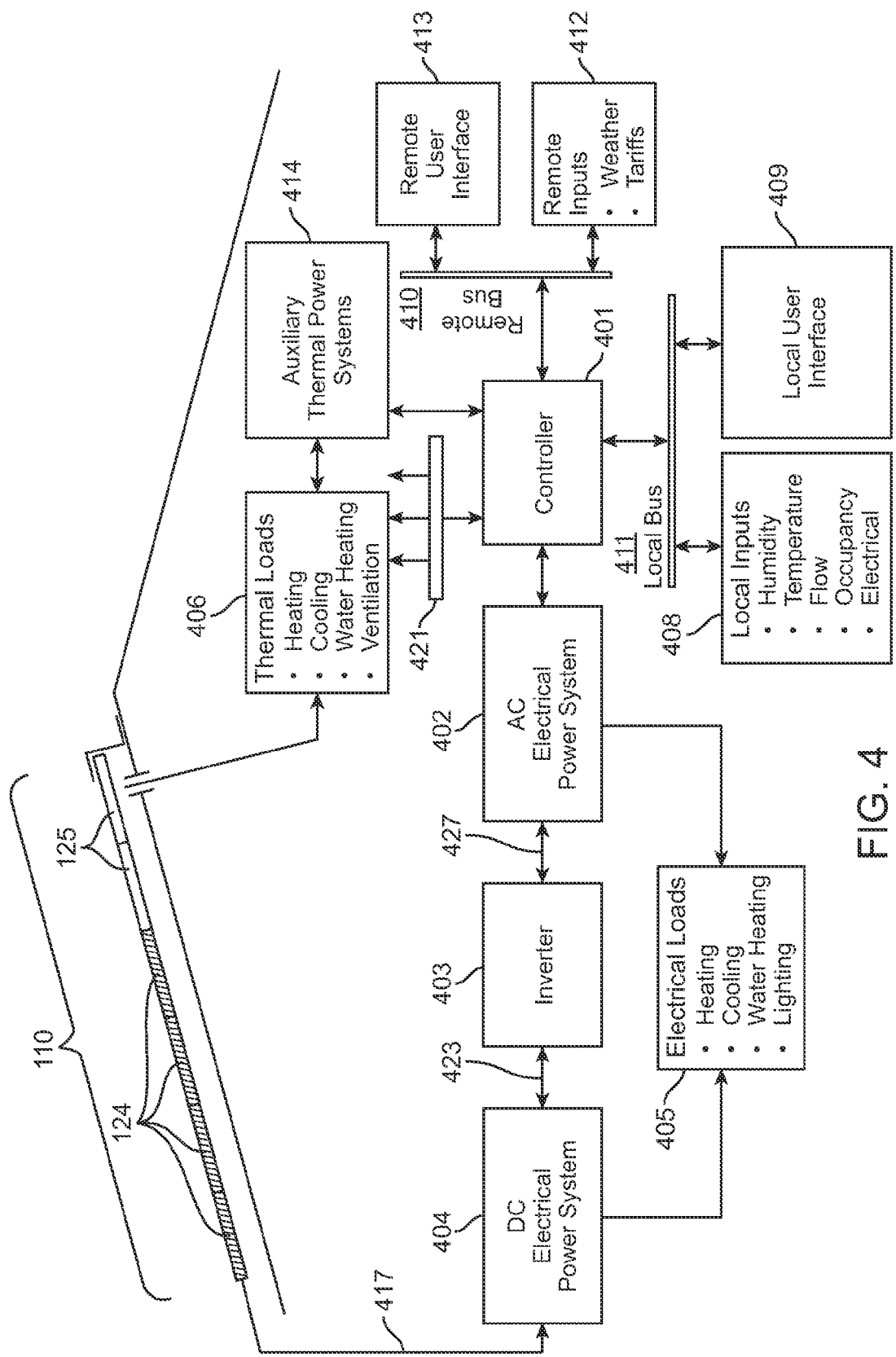
FIG. 4 is a simplified schematic diagram of a controller configured on the solar thermal system according to an embodiment of the present invention.

FIG. 4 is a simplified schematic diagram of a controller configured on the solar thermal system according to an embodiment of the present invention. This diagram is merely an example, which should not unduly limit the scope of the claims herein. One of ordinary skill in the art would recognize other variations, modifications, and alternatives. A system includes a controller 401 and control equipment 421 which combine to manage distribution and use of thermal energy output from system 110 to any one or more thermal loads 406. The control equipment 421 includes hardware, firmware and/ or software that is controllable by controller 401. As described with an embodiment of FIG. 2, examples of control equipment 421 may include (i) equipment that causes airflow 122 under solar system 110 (e.g. blower 204), (ii) sensors, including temperature sensors (e.g. sensor 251), for reading information about incoming fluid 122 or information about fluid downstream in usage by the system, (iii) heat exchanges, and (iv) dampeners and other equipment for directing fluid 122 internally. Additionally, the controller 401 may be configured to interface with electric power systems, thermal components, user data, and a wide range of inputs within the system and the target location of the system 110.

In an embodiment, the system 110 produces electrical power 417 from the PV modules 124 which is fed into the DC Electrical Power System 404. The DC electrical power system 404 outputs DC power 423, which may then be fed either directly into electrical loads 405 that can operate on DC power, or to an alternating current inverter 403. The inverter 403 may convert DC power 423 to AC power 427. The AC power 427 may be supplied to the AC electrical power system 402. The AC power 427 may then be fed either directly into electrical loads 405 that can operate on AC power, or back onto the utility grid. The DC electrical power system 404, Inverter 403, and AC electrical power system 402 may be interfaced with the Controller 401. Depending on the inverter capability, information regarding both DC 404 and AC 402 electrical power systems may be queried by the controller 401 from the inverter 403. Alternately, transducers may be placed on the DC electrical power system 404 or AC electrical power system 402 to determine electrical production from the system 110, or consumption from the various electrical loads 405.

The controller 401 also interfaces to the thermal loads 406 including heating, cooling, water heating, ventilation systems and auxiliary thermal power systems 414 such as boilers, furnaces, air conditioners, heating elements, and other devices that can supply the thermal loads 406 in tandem with the solar thermal system 110.

Local inputs 408 may include, for example, humidity, temperature, flow rates, occupancy of the structure, electrical demand, and other information of a nature local to the structure that can assist in the ability to optimize system 110 performances and load management through appropriate control strategies. The system may also have a local user interface 409 for direct communication with the controller 401 or interfaced devices such as the inverter 403, electrical power systems 402, 404 and auxiliary thermal power systems 414.

A remote data bus 410 enables communication of all remote inputs and remote user interface through any remote communication protocol. Examples of the remote communication protocol include wired and wireless Ethernet, mobile phone networks, satellite, and other communication protocols. A local data bus 411 provides the communication path for local inputs 408 and user interface 409 to the controller 401 and between devices. It may be possible that both the remote and local bus 410, and 411 use the same communication protocols. Either bus 410 or 411 may consist of one or more protocols operating in tandem to establish communications with separate devices.

According to an embodiment, a dedicated remote input 412 may be provided for the remote bus 410 to enable access to information such as weather data or tariff rates of utilities. The remote inputs 412 may provide an automated and programmatic mechanism to provide such information to controller 401 along with other relevant information.

Still further, one or more embodiments provide for other types of data to be accessed or provided to the controller 401 through the remote user interface 413. The remote user interface 413 may allow the user to enter data or parameters into the system controller or other devices in communication with the controller 401.

Figure 5:
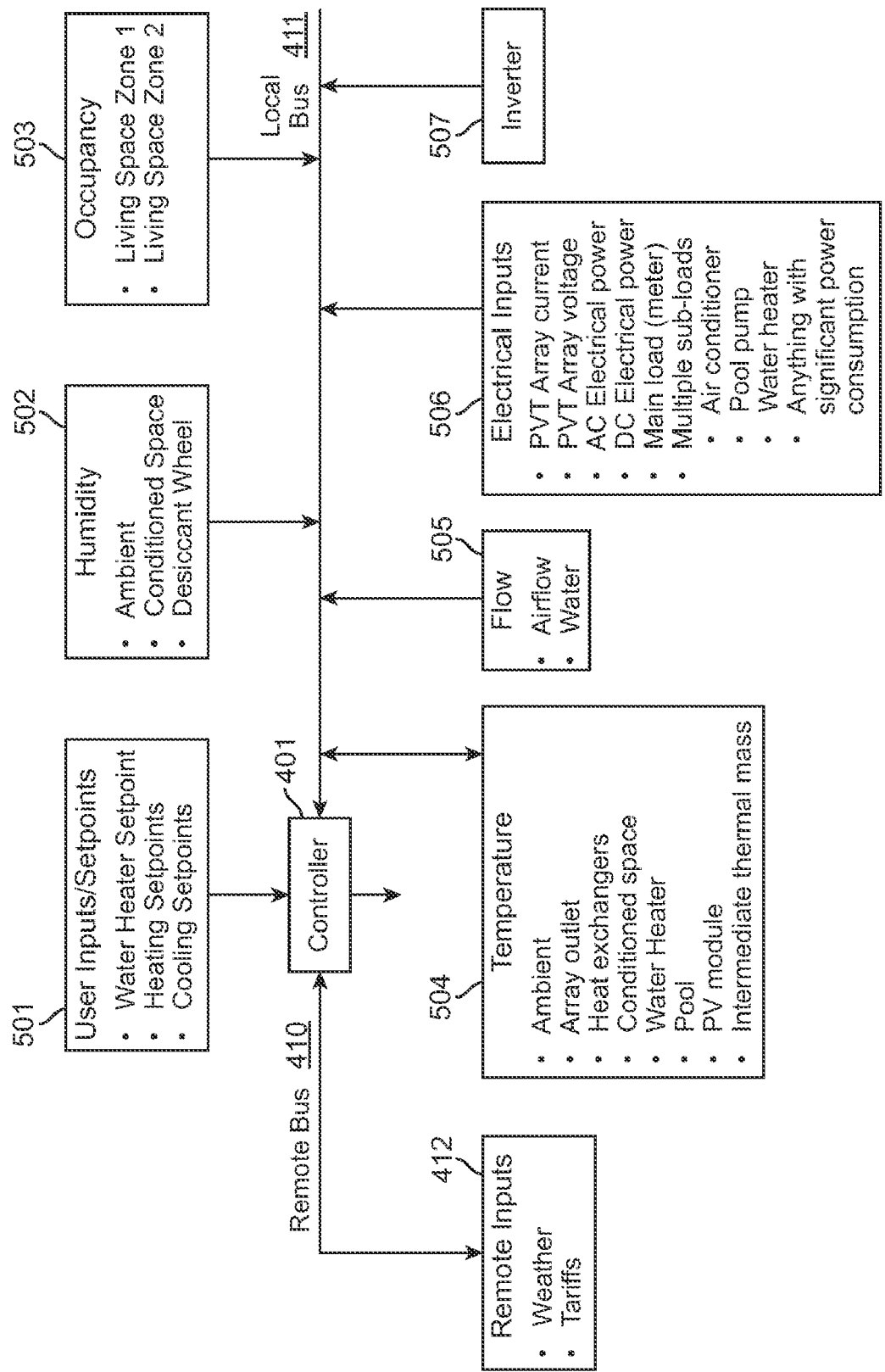
FIG. 5 is a simplified block diagram of different input components that are controllable by a controller, according to one or more embodiments of the present invention.

FIG. 5 is a simplified block diagram of different input components that are controllable by a controller, according to one or more embodiments of the present invention. This diagram is merely an example, which should not unduly limit the scope of the claims herein. One of ordinary skill in the art would recognize other variations, modifications, and alternatives. With reference to an embodiment of FIG. 4, controller 401 can receive many inputs from a variety of local sensors and through the remote and local busses 410 or 411. Access to system data and information may be relevant to the ability to create control strategies and algorithms that optimize system performance. As described, the inputs may be in the form of information, including User Inputs/Setpoints 501, humidity input 502, occupancy information 503, temperature information 504, flow information 505, electrical inputs 506, and inverter data 507. In an embodiment, controller 501 receives User Inputs/Setpoints 501 through the local user interface 509 or the remote user interface 513. Examples of User Inputs/Setpoints 501 may include occupancy status, water heater setpoint, heating and cooling setpoints for the conditioned space, and other operational setpoints.

Humidity input 502 may be provided through sensors that are positioned to detect humidity from, for example, ambient air, the conditioned space, and/or airstreams within the systems that may include thermal storage, heat exchangers, desiccant wheels or heat recovery systems.

Occupancy information 503 may be automatically sensed by ultrasonic or infrared sensors typically used in motion detectors. The structure can be divided into zones and occupancy can be reported to the controller by zone. As an alternative or addition, occupancy information 403 may be inferred from, for example, usage of appliances through a monitoring of electrical loads 405.

Temperature information 504 may be collected from various sources. One or more embodiments provide that the temperature information may be provided by measurements that are made for a determined optimal operation of the system. With reference to an embodiment of FIG. 5, the temperature information 504 includes, for example, the reporting of ambient air temperature through sensor 255 (FIG. 2), array output temperature through sensor 215 (FIG. 2), the temperature after fluid 122 passes through heat exchangers at sensor 252 (FIG. 2), air temperature in conditioned space 221 through sensor 256 (FIG. 2), temperatures in the water heater through sensors 253 and 254 (FIG. 2), and other temperature measurements as may be required by the system.

Flow information (and/or inputs) 505 may include information that identifies or indicates the volume of air flowing through a particular duct or section of the system and the flow of liquids in hydronic loops. Flow information 505 may be in various forms, such as in the form of actual mass or volumetric flows, and/or in the form of simple on/off indicators as to whether flow exists or not.

Electrical inputs 506 include, for example, current and voltage provided by the PV modules 124 (FIG. 1), outputs from DC electrical power system 404 (FIG. 4), outputs from AC electrical power system 402, the main meter for the structure, and the load demand for individual or multiple sub loads 405. Examples of sub loads 405 include air conditioners, pool pumps, lighting, water heaters and/or anything with electrical power consumption to be metered.

The controller 401 may also interface with the inverter 403 to obtain operating information regarding the electrical performance of the inverter, the current and voltage characteristics of PV modules 124 connected to the inverter 403, and the export of power from the inverter 403 to the AC electrical power system 402.

In addition, the controller 401 can receive data from remote inputs. The data from remote inputs may include, for example, weather data, energy pricing, and tariff schedules from the utility for energy. These and other data sets may be provided to the controller over the remote bus 410, user inputs 501, or potentially the local bus 411.

Figure 6:
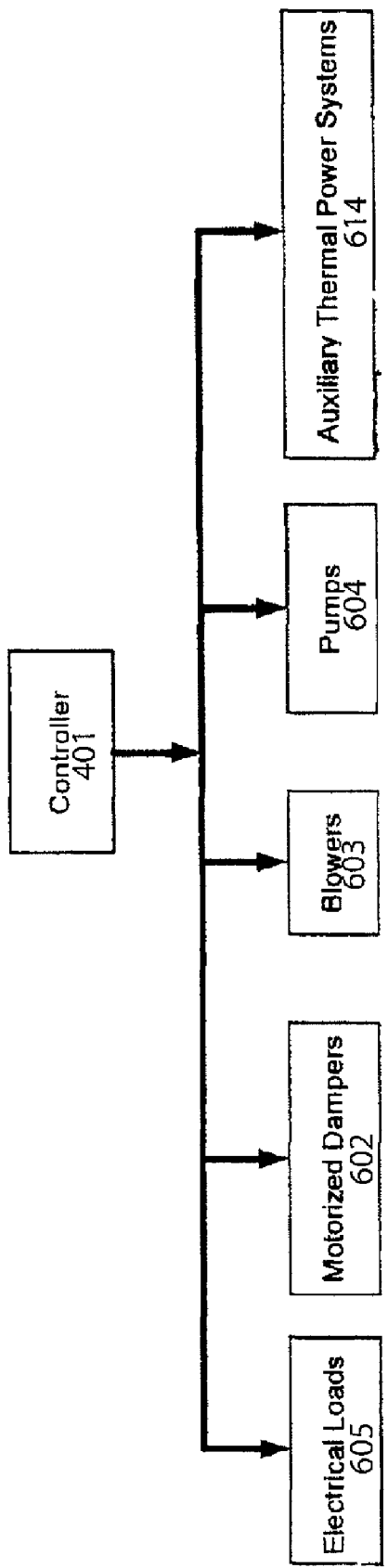
FIG. 6 is a simplified block diagram of different output components that are controllable by a controller for use as part of a system for performing optimization operations, according to an embodiment of the present invention.

FIG. 6 is a simplified block diagram of different output components that are controllable by a controller for use as part of a system for performing optimization operations, according to an embodiment of the present invention. This diagram is merely an example, which should not unduly limit the scope of the claims herein. One of ordinary skill in the art would recognize other variations, modifications, and alternatives. The physical elements may not only optimize generation of the solar thermal system 110, but also facilitate or enable control and regulation of any electrical loads 605 or components of the thermal power systems 614.

In one embodiment, controller 401 is connected to regulate or modulate any of the electrical loads 605 connected to the DC electrical power system 404 (FIG. 4) or AC electrical power system 402 (FIG. 4), as indicated by output block 605. The controller 401 may also operate any combination of blowers 603 and dampers 602 to move and direct airstreams to transfer thermal energy. Operation of pumps through output block 604 is also possible. Control over auxiliary thermal power systems 605 is also possible and allows coordination of generation from the system 110 and these backup energy systems. Additional output blocks may be provided as necessary for the controller 401 to interface with and influence any system components that may impact the generation or use of energy within the structure.

One or more embodiments provide for using controller 401 in order to implement strategies or optimization schemes for different criteria. In an embodiment, the controller 401 may simultaneously assess the demands of the various loads within the target location. These loads may include, for example, water heating, space heating, ventilation, and electrical consumption. The loads may be assessed in tandem with (i) the ability of the system 110 to provide the electrical and thermal power outputs to service these loads, and optionally (ii) in connection with criteria or parameters for optimizing the electrical/thermal outputs.

Under an embodiment, the optimization required by the controller 401 can be divided into several components. A first part of the optimization provides for the controller to set the ventilation rate $V_o$ for the system 110 which is dictate the thermal and electrical operating efficiencies ($\eta_{thermal}$ and $\eta_{electrical}$), and therefore array outputs at a given set of ambient conditions. Setting of the ventilation rate $V_o$ may include one or more of the following considerations:

(i) For any thermal load, the controller 401 should assess the temperature at sensor 251 (FIG. 2) necessary at the array outlet 201 (FIG. 2) required to service the particular load. For practical purposes the array outlet temperature at 251 should exceed the load temperature by a reasonable margin to promote heat transfer. Examples of representative load temperatures would be the temperature of the water heater at sensor 253 (FIG. 2) or conditioned space 221 (FIG. 2), but may be that of any load.

(ii) The controller may assess whether it can provide this array outlet temperature 251 under prevailing ambient conditions such as solar irradiance, ambient temperature 255, and other conditions such as wind speed that might affect performance of the solar thermal system 110. In one embodiment, this assessment is made responsive to the assessment of the thermal load. The assessment for the array outlet temperature at sensor 251 may be made by varying the ventilation rate $V_o$ and monitoring outlet temperature at sensor 251, or by referencing a known performance map for the system 110 that is stored in the controller which describes operation over a broad range of environmental conditions.

(iii) The controller 401 may subsequently or responsively assess the combined thermal and electrical operating efficiencies ($\eta_{thermal}$ and $\eta_{electrical}$) that govern the overall efficiency, as well as the output of the system 110 at the operating temperature required by the loads the system 110 is capable of servicing.

In an embodiment, a second part of the optimization is related to how controller 401 sequences or modulates the thermal energy provided at the array outlet 201 among the various thermal loads. In most physical layouts of the loads, such as those depicted in FIG. 2, the system is capable of providing DHW service and space heating simultaneously. In regards to FIG. 2, the controller 401 may regulate the amount of energy provided to the water heater 217 by modulating the operation and speed of pump 216 to extract varying amounts of energy from the air stream through heat exchanger 203. Pulling more energy from the airstream for the water heater 217 using heat exchanger 203 leaves less energy for space conditioning to be provided through damper 206 and vent 212 into the conditioned space 221.

The controller may subsequently decide upon which use of the energy is more important in determining the modulation of energy between the loads. In the case of the embodiment illustrated with FIG. 2, in which the backup heating for the water heater 217 is be provided by an electric element 220, it may be more critical to supply this load on first priority so as to prevent electrical consumption by the electric element 220. Such an optimization scheme may best be implemented if the backup heating system for the conditioned space 221 is provided by a high efficiency furnace using lower cost natural gas. However, if the backup means for heating system is provided through electrical resistance heating, then the cost of providing energy to water heater 217 or conditioned space 221 may essentially equal each other. The controller 401 may then determine which load to service to maximize array output.

Another optimization-scheme or sub-scheme may be provided in connection with the thermal production and electrical production of the system 110. Embodiments of the invention recognize that maximizing PV production at the expense of thermal production would, in many cases, demand a maximum ventilation rate Vo by blower 204 (FIG. 2), at least to the practical point where the gains in electrical output and efficiency $\eta_{electrical}$ are mitigated by parasitic consumption in the blower 204. However, operating the blower 204 at high ventilation rates $V_o$ results in relatively low outlet temperatures for the array. The array outlet temperature at sensor 251 in these scenarios may be below an utilizable temperature for space conditioning or DHW production. For instance, a case could be imagined where ambient temperature is 5° C., and where the blower 204 operates at full speed to maximize PV output. In such a scenario, the array outlet temperature at sensor 251 may be 18° C., which is not sufficient to provide space heating. By lowering the blower 204 speed slightly, it may be possible to achieve 26° C. array outlet temperatures at sensor 251 that only slightly lowers efficiency and production of the PV modules 124, but provides a significant contribution to heating and ventilation of the conditioned space 221.

In an embodiment, controller 401 may be configured to perform multivariate optimization in the control of the speed of the blower 204, pump 216 and/or operation of dampers 205 and 206. Such control may be used to maximize the net energy production of the system 110 in both thermal and electrical energy production. It should be noted that the controller does not necessarily discretely change operating modes from 100% service of anyone mode to another, but instead may often perform triple-generation in the form of modulating and optimizing the energy gains of all three modes of operation simultaneously. This is as a result of system 110 being capable of providing electrical power to the DC electrical power system 404, DHW production, and space conditioning simultaneously. The controller 401 may be structured to give preference to one particular mode of generation over another through variable speed operation of the blower 204 and pump 216, as well as effecting the positions of the dampers 205 and 206.

With regards to operation of controller 401, the controller may be equipped to implement various schemes that factor various priorities and variables. These schemes may range from simple weighted priorities of each load on the system to a complex multivariate analysis of system efficiencies, costs of providing auxiliary energy, physical characteristics of the structure including occupancy, load profiles, and thermal response of the structure. Additionally, one or more embodiments provide that weather data is used to anticipate and estimate energy production from the system 110, as well as demands of the loads that may be comprised of electrical loads 405 and thermal loads 406 that are sensitive to weather.

Some representative examples of how these inputs and factors may be weighted into the controller's decisions on how to optimize operation of the system are provided in the following.

Embodiments of the invention recognize benefits in the controller 401 knowing the source and efficiency of the auxiliary thermal power systems 414 that provide energy to the loads in tandem with the system 110. With respect to FIG. 2, for example, the auxiliary thermal system for the water heater 217 is the electric heating element 220, but may take other forms. In such cases, controller 401 may operate to prevent or reduce the auxiliary thermal power systems 414 from operating to consume energy in the form of electricity, natural gas, propane, or other base fuel. The optimization scheme of controller 401 may include information that identifies the auxiliary thermal power systems, as well as their operating characteristics and energy consumption costs. Additionally, knowing the cost of the fuel to operate the backup systems when combined with the efficiency of the devices may assist the controller 401 in determining the cost of providing auxiliary power to any load. The types of auxiliary thermal power systems 414, their efficiency, and fuel source may be programmed into the controller 401 using any of the remote user interface 413, local user interface 409, or other means. Likewise, cost of the fuel used to operate these systems may be programmed into the controller 401 through similar means, or queried as a remote input 412.

In addition to the base cost of fuels, fuel costs may include time-variant components, in which the cost of the energy varies by time of day, or time of year. As an example, several electric utilities offer a time of use rate where electricity may cost $0.29/kWh on-peak from 12:00-19:00 and $0.09/kWh off peak during the remaining hours. Superimposed on this rate schedule can be a shift in base electricity cost during summer and winter period. Rate schedules like these are often employed and advantageous for installations of PV modules 124 that generate energy during the on-peak period.

One or more embodiments of the invention configure controller 401 to be aware that the structure of target location 152 is utilizing such time-variant rates. In such an embodiment, controller 401 may be configured to optimize for maximum electrical generation from the PV modules during the on-peak time and act to defer any loads using electricity until after peak. As an example, if the auxiliary thermal power systems 414 includes a (i) furnace for heating the conditioned space 221 by natural gas, and (ii) a water heater 217 powered by an electrical element, then controller 401 may be configured to optimize for DHW production during the on-peak time to prevent the electrical element from consuming on-peak electricity, while allowing the auxiliary system for heating the conditioned space 221 with natural gas to operate, which traditionally does not have a significant time-variant rate.

While current time-variant rates are mostly structured by set times of the day, there is movement in markets towards 'real time pricing' in which a spot market approach is used to set rates in real time. In such a case, the controller 401 may be configured to access real time rates as a remote input 412 over the remote bus 410, and to factor the real-time rates in optimizing the mix of thermal and electrical energy production from the system 110. This may be done as part of an optimization scheme to minimize operating costs of the auxiliary thermal power systems 414, AC electrical power systems 404 servicing the loads in real time.

Still further, another optimization scheme may be provided as follows. In some utility rate structures the cost of energy is 'tiered' in that a baseline rate is established with escalating tiers of rates beyond the baseline. If the controller 401 has knowledge of the tier structure and energy consumption of the structure, then the controller can implement optimization control based on this usage tiered pricing in its goal of minimizing energy costs. This can be done by giving preference on generation of the system 110 towards those loads whose auxiliary energy systems use fuels whose usage is approaching higher tier rates. The controller 401 may acquire knowledge of the tiered rate structure using the remote user interface 413, remote inputs 412, local user interface 409, or other means. Knowledge of energy consumption to compare against the tiers can be provided to the controller by monitoring the electrical inputs 506 in the form of the main load (meter) or monitoring of sub-loads.

In determining another optimization scheme, one or more embodiments may factor in situations where the utility source has demand charges for electricity that is a fixed charge based upon peak monthly power consumption at the target location 152. Such demand charges can constitute significant portions of the total utility charges for the target location 152. Since the controller 401 has the capacity to monitor the electrical production from the array 110, as well as the consumption of various loads through input block 506, controller 401 may be configured to minimize coincident net power consumption. This results in the lowering the demand charge, and therefore total energy costs.

With regards to electrical energy output of the system 110, the physical characteristics of the structure do not often impact the energy production other than physically supporting the array. With regards to the thermal energy output of the system 110, the physical characteristics of the structure and loads can have significant impacts on energy production of the system 110, as well as the consumption of fuel from the auxiliary thermal power systems 414. These characteristics range from the thermal mass of the conditioned space 221 to occupancy profiles of the structure, and consumption profiles from the water heater 217. There are many possible ways for the controller 401 to utilize these physical characteristics as part of implementation strategies or optimization schemes.

In a specific embodiment, numerous mechanisms and means may be used to detect occupancy of the target location 152. In the structure of a home or building, occupancy may be detected with, for example, occupancy sensors 503, although other measurements (e.g. appliance or lighting usage) may also be detected and used. If the structure is determined to unoccupied, the controller may permit the temperature of the conditioned space 221 as monitored by sensor 256 to float outside of the typical range. Furthermore, DHW production may be reduced or even eliminated. Therefore, the controller 401 may maintain the space in a wide, but reasonable temperature range that would minimize energy demands from any auxiliary thermal power systems 414 for space conditioning. In a similar manner, the controller 401 may completely avoid DHW production from both the system 110 as well as from any auxiliary thermal power systems 414. Because electrical production from the system 110 can often be stored on the utility grid as a valuable credit for later consumption, the controller 401 may be configured to optimize efficiency $\eta_{electrical}$ of the PV modules to create a credit for later electrical demand.

In addition to the two states of the structure being occupied or unoccupied, embodiments recognize that the actual occupancy and load profiles can shift over the course of a day and/or seasonally. For example, in case where target location 152 (FIG. 1) is a residence of occupants that work elsewhere, there may be high morning and evening demands with few mid-day demands, as the occupants may be at work. Thus, there are anticipated time periods where the conditioned space 221 is empty. In a business setting, the occupancy and loads are typically inverted from this residential case. As a result, the thermal loads such as DHW production from the water heater 217 can be reduced mid-day for a residential setting. Likewise, the temperature of the conditioned space 221 as monitored by sensor 256 may be allowed to swing outside a narrowly controlled range, and the water heater 217 need not be at a full setpoint temperature for DHW service (as monitored by the upper tank temperature 254). By allowing strict setpoints to vary, energy production from the a system 110 may be further optimized by increasing the energy that these loads can store, as well as the use of auxiliary thermal power systems 414 is minimized by reducing setpoints.

As an example of a load profile strategy, water heater 217 may be assumed to have sufficient thermal capacity to provide morning showers for the occupants. After morning showers, however, the temperature at the top of the water heater 217 as monitored by sensor 254 becomes lower than a user supplied setpoint 701. Embodiments recognize that instead of using the electric element 220 to recharge the water heater 217 in the early morning before energy is available from the system 110, the controller 401 may be configured to infer the occupancy habits of the structure. Specifically, controller 401 may determine when the target location (e.g. residence) is unoccupied (e.g. starting at mid-morning) and then disable the electric element 220 in anticipation that energy would be available from the system 110 to heat the water heater 217 a few hours later. Thus, the controller 401 may be configured to recognize that the hot water does not need to be immediately replenished, but rather can be replenished later in the day when more energy is available from the system 110. In a similar manner, the controller 401 may allow the temperature of the conditioned space 221 as monitored by sensor 256 to drop during unoccupied times.

As an alternative or addition, the controller 401 may permit heating the conditioned space 221 above the desired set-point temperature during the middle of the day knowing that the temperature in the conditioned space 221 as monitored by sensor 256 would reach a suitable level when the occupants returned. In this way, controller 401 can use the conditioned space 221 as thermal energy storage. Such usage would not normally be possible if strict set-points of the temperature in the conditioned space 221 were maintained at all times.

The most direct method of inferring occupancy of the structure is through the use of occupancy sensors 503 that can communicate over the local bus 411 with the controller. However, an embodiment recognizes that occupancy and usage may be inferred by other system parameters accessible to the controller 401 through, for example, the local bus 411. One such method would be to evaluate changes in the power requirements of any electrical loads 405, such as lighting or usage of major appliances (e.g. washing machine) that would be associated with occupancy and monitored through electrical inputs 506.

It is also understood that the examples and embodiments described herein are for illustrative purposes only and that various modifications or changes in light thereof will be suggested to persons skilled in the art and are to be included within the spirit and purview of this application and scope of the appended claims. Further details of a specific technique for monitoring and verifying a solar thermal system can be found throughout the present specification and more particularly below.

Figure 7:
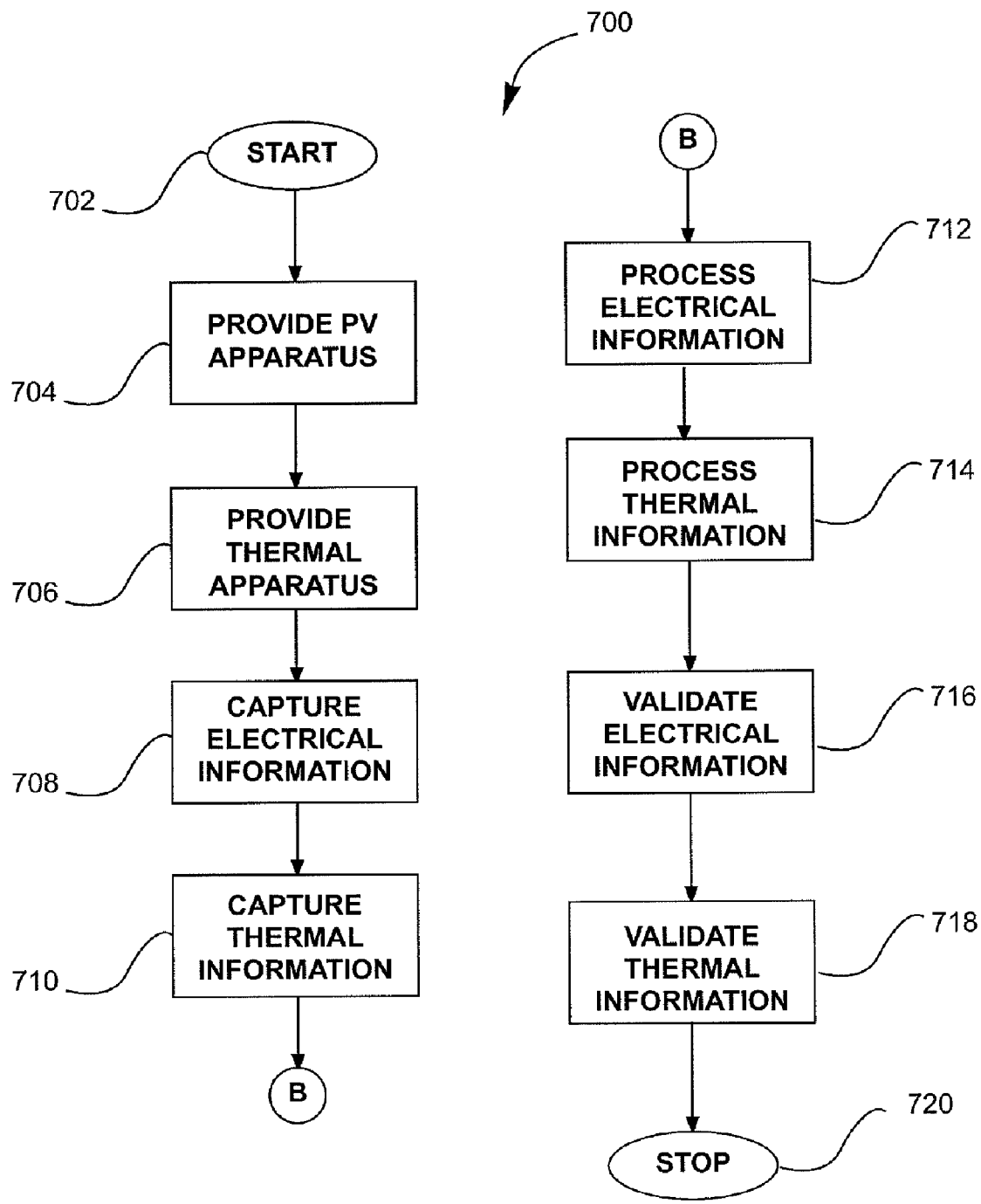
FIG. 7 is a simplified flow diagram illustrating a method of processing information from the solar thermal system according to an embodiment of the present invention.

FIG. 7 is a simplified flow diagram illustrating a method of processing information from the solar thermal system according to an embodiment of the present invention. This diagram is merely an example, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

As shown in FIG. 7, the present method can be briefly outlined below.

1. Start;
2. Provide a photovoltaic apparatus comprising a first electrical member and a second electrical member;
3. Provide a solar thermal apparatus coupled to the photovoltaic apparatus;
4. Capture electrical information associated with operation of the photovoltaic apparatus;
5. Capture thermal information associated with operation of the solar thermal apparatus;
6. Process the electrical information associating the electrical information against one or more parameters;
7. Process the thermal information associating the thermal information against one or more parameters;
8. Validate the electrical information against the one or more electrical parameters;
9. Validate the thermal information against the one or more thermal parameters; and
10. Stop.

These steps are merely examples and should not unduly limit the scope of the claims herein. As shown, the above method provides a way of validating an energy output from solar thermal system according to an embodiment of the present invention. In a preferred embodiment, the method uses electrical information from a photovoltaic module as reference information for a thermal module. One of ordinary skill in the art would recognize many other variations, modifications, and alternatives. For example, various steps outlined above may be added, removed, modified, rearranged, repeated, and/or overlapped, as contemplated within the scope of the invention.

As shown in FIG. 7, the method 700 begins at start, step 702. The present method provides a data validation method for detecting a failure or inconsistency in system operation of the solar thermal system. Detecting a failure or inconsistency in system operation is useful from the vantage of not only maintenance (e.g. whether the system is broken or needs repairs), but also from the validation and confidence in the recorded data (whether the data can be internally checked for consistency, which leads to higher confidence in the data). In regards to this latter point, validation can play a role in standards for data consistency within incentive programs. Here, the method begins at a solar thermal system implemented at a target location, such as the one noted above, as well as others.

The solar thermal system including a photovoltaic apparatus can have a first electrical member and a second electrical member, step 704. The first electrical member and the second electrical member can be, for example, photovoltaic solar modules within an array of modules, or a detector or sensor that is included in the photovoltaic apparatus. Of course, there can be other variations, modifications, and alternatives.

The solar thermal system including a solar thermal apparatus coupled to the photovoltaic apparatus can have a flow region designated by a first measurement region and a second measurement region, step 706. The first measurement region can be configured by a spatial distance to the second measurement region. In a specific embodiment, the first measurement region can include a sensor device such as a resistance temperature detector (RTD), and others. Similarly, the second measurement region can include a sensor device such as a thermocouple, and others. Alternatively, multiple sensor devices can be configured in each of the regions according to alternative specific embodiments.

Through the operation of the photovoltaic apparatus, electrical information can be captured, step 708. The electrical information can be derived from the first electrical member and the second electrical member. In a specific embodiment, the electrical information can be derived and captured through the controller for the solar thermal system. Information carried from the interface module of the controller can provide the mechanism for capturing the desired electrical information. In a specific embodiment, the electrical information can include at least current, voltage, resistivity, capacitance, inductance, any combination of these, and others. Of course, there can be other variations, modifications, and alternatives.

Through the operation of the solar thermal apparatus, thermal information can be captured, step 710. The thermal information can be derived from the first measurement region and the second measurement region. In a specific embodiment, the thermal information can be derived and captured through the controller for the solar thermal system. Information carried from the interface module of the controller to the control module of the controller can provide the mechanism for capturing the desired thermal information. In another specific embodiment, the first measurement region can include a third and fourth region, and the second measurement region can include a fifth and sixth region. In a specific embodiment, the first measurement region can include a sensor device such as an RTD, and others. Similarly, the second measurement region can include a sensor device such as a thermocouple or plurality or thermocouples, and others. Alternatively, multiple sensor devices can be configured in each of the regions according to alternative specific embodiments.

Once the electrical information is captured, the electrical information can be processed and associated against one or more parameters, step 712. In a specific embodiment, the captured electrical information can be processed and associated against one or more parameters through control signals from the controller of the solar thermal system. This is accomplished by inferring a common metric from different measured data such that the common metric can be compared using, for example, statistical analysis. There are a number of outputs that can be measured on a solar thermal system and consequently used to infer a common metric, including, but not limited to, electrical power output, current output, thermal energy output, temperature rise across the array, and temperature change anywhere in the system.

Once the thermal information is captured, the thermal information can be processed and associated against one or more parameters, step 714. In a specific embodiment, the processing of the electrical information and the thermal information can also be used to associate the electrical information to the thermal information and further output a power correlation associated with the photovoltaic apparatus and the solar thermal apparatus for a determined time. In another specific embodiment, the processing of the electrical information and the thermal information can also be used to associate the thermal and electrical information to output an energy correlation associated with the photovoltaic apparatus and the solar thermal apparatus.

The processed electrical information is then validated against one or more electrical parameters, step 716. In a specific embodiment, the validating of the electrical information can be done through associating the electrical information with, for example, a stand-alone energy meter, or any other measurement device. Additionally, the validating of the electrical information can be used to receive monetary compensation. In another specific embodiment, the one or more electrical parameters may include one or more thermal parameters.

The processed thermal information is then validated against one or more thermal parameters, step 718. In a specific embodiment, the validating of the thermal information can be done through associating the thermal information with one or more standard processes. These processes can include, for example, a thermal energy metering device such as a stand-alone BTU meter, or any other measurement device. Validation of the thermal information can also output a power correlation of the solar thermal array. Additionally, the validating of the thermal information can be used to receive monetary compensation. In another specific embodiment, the one or more thermal parameters may include one or more electrical parameters.

The above sequence of processes provides a data validation method for a solar thermal system according to an embodiment of the present invention. As shown, the method uses a combination of steps including providing both an electrical and thermal apparatus, capturing both electrical and thermal data, processing both electrical and thermal data, and validating both electrical and thermal data. Other alternatives can also be provided where steps are added, one or more steps are removed, or one or more steps are provided in a different sequence without departing from the scope of the claims herein. In yet alternative embodiments, thermal information from the thermal solar system can also be associated with information from one or more other sources for validation. As an example, such other sources can include other arrays (whether thermal or photovoltaic) in other spatial or geographic locations, clear sky radiation or other theoretical information, any combination of these, and others. Further details of the present method can be found throughout the present specification and more particularly below.

In a specific embodiment, after the thermal and/or electrical data is captured, a number of methods can be used for data validation for the solar thermal system, as well as other alternative methods for capturing information from other sources to be associated with information from a solar thermal system. Three alternative methods can be described, but are not limited, by the following:

(i) Self-Consistency: The thermal and electrical output of a solar thermal system are compared through a common metric to ensure both aspects of the system are operating correctly.

(ii) Multiple Arrays: A number of solar systems in proximity are compared through a common metric to ensure they are operating correctly.

(iii) Clear-Sky Radiation: The local theoretical "clear-sky" solar radiation for a solar system and its measured output are compared through a common metric to ensure it is operating correctly.

In a specific embodiment, the approach with the self-consistency method includes to check for consistency between the thermal and electrical output in a given particular solar thermal system. Considering that if there is only a single output (e.g. electrical), there exists no reference point to check the performance against. If the solar thermal system seems to be inoperative, then it may be due to a cloudy day, or due to broken components. Without a reference comparison, there is no way to establish knowledge of the possibly malfunction. Some monitoring systems use a pyranometer (solar intensity sensor) to provide the reference point. However, this results in added cost and complexity. The concept here is to use the photovoltaic and thermal systems to counter check each other for consistency. Indicative of an irradiance level, as used herein "irradiance" will refer to the rate of electromagnetic radiation from the sun incident on a surface, of 1000 W/m². If the system is producing thermal energy indicative of an irradiance level of 1,000 W/m², but electrical output indicative of 200 W/m² then there is a problem with one of the systems. This is accomplished by inferring a common metric from different measured data such that the common metric can be compared using, for example, statistical analysis. There are a number of outputs that can be measured on a solar thermal system and consequently used to infer a common metric, including, but not limited to, electrical power output, current output, thermal energy output, temperature rise across the array, and temperature change anywhere in the system.

In another specific embodiment, the approach with the multiple arrays method is to check for consistency between the thermal and electrical output of a particular solar thermal system against a number of other solar thermal systems within close proximity. In order to ensure an individual solar thermal system is operating correctly, a pyranometer is required to measure the incident solar radiation. However, this expensive device is not required if there are a number of solar systems in vicinity to each other. By using the accumulation of data from the systems, an overall solar radiation, or irradiance, for the area can be calculated and used to check each individual system to ensure it is operating correctly.

In yet another specific embodiment, the approach with the clear-sky radiation method is the check for consistency between the thermal and electrical output of a particular solar thermal system against theoretical calculations of the correct thermal electrical output for ideal condition. It is well documented that the amount of extraterrestrial, for example, before scattering and absorption in the atmosphere, solar radiation that reaches the Earth is 1367 W/m². Knowing this, methods have been developed to estimate the clear-sky, or sky without clouds present in the atmosphere, beam and diffuse radiation that reaches an array. These theoretical models can be used to build a prediction of solar intensity, or radiation, on a clear-sky day to benchmark a system based on, for example, its location, orientation, day of the year, and climate. The location is determined by parameters such as latitude, longitude, and altitude. The orientation is determined through parameters such as slope and azimuth. The predictions can be made by comparing the predicted solar radiation from the clear-sky assumption with a radiation, or irradiance, implied from a measured output, which could be, for example, electrical power generation, thermal power generation, or current output from the array. Of course, there can be other variations, modifications, and alternatives.

Figure 8:
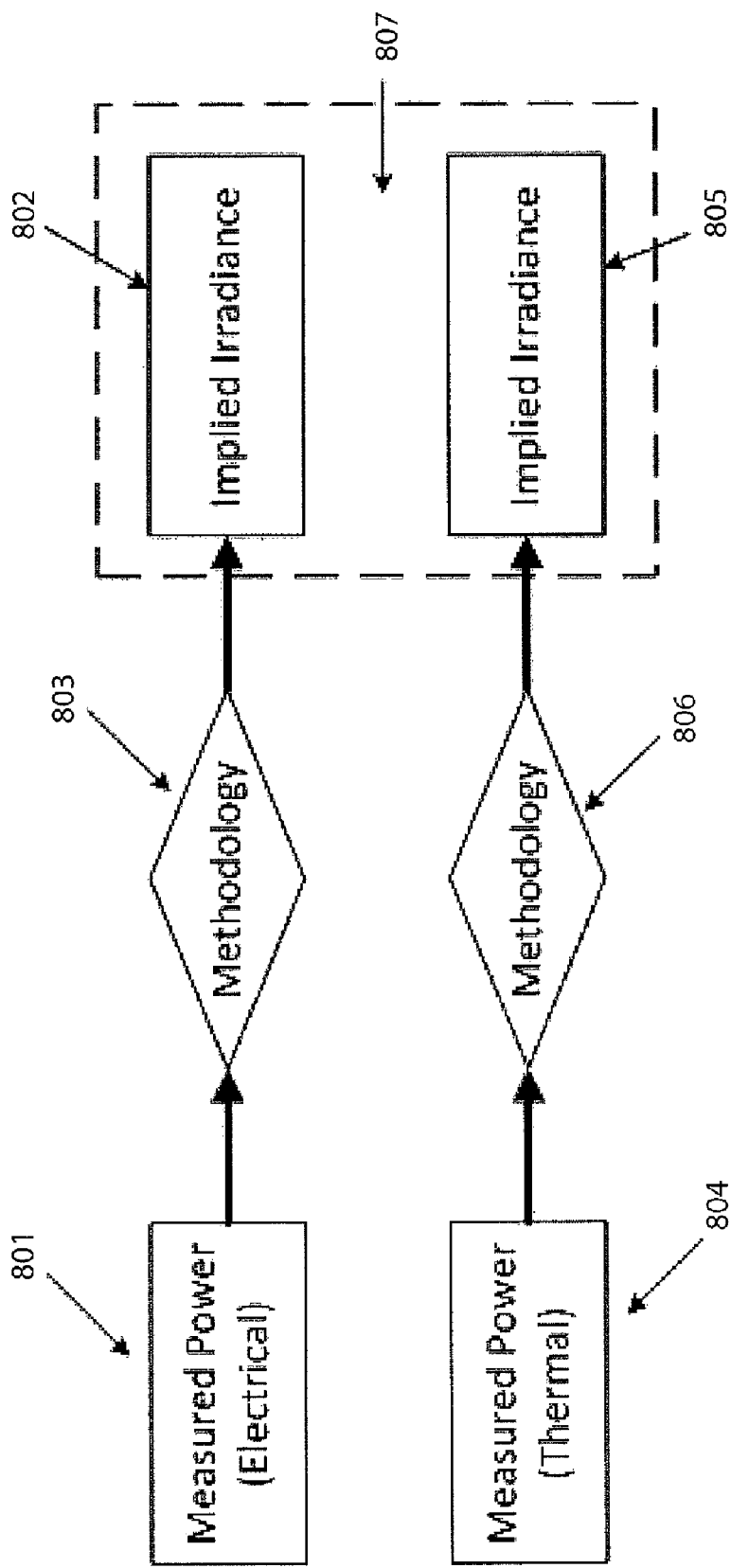
FIG. 8 is a simplified flow diagram of processing information from the solar thermal system according to a specific embodiment of the present invention.

FIG. 8 is a simplified flow diagram of processing information from the solar thermal system according to an embodiment of the present invention. This diagram is merely an example, which should not unduly limit the scope of the claims herein. One of ordinary skill in the art would recognize other variations, modifications, and alternatives. In a specific embodiment, the approach with the self-consistency method includes to check for consistency between the thermal and electrical output in a given particular solar thermal system. Considering that if there is only a single output (e.g. electrical), there exists no reference point to check the performance against. If the solar thermal system seems to be inoperative, then it may be due to a cloudy day, or due to broken components. Without a reference comparison, there is no way to establish knowledge of the possibly malfunction. Some monitoring systems use a pyranometer (solar intensity sensor) to provide the reference point. However, this results in added cost and complexity. The concept here is to use the photovoltaic and thermal systems to counter check each other for consistency. If the system is producing thermal energy indicative of an irradiance level of 1,000 W/m², but electrical output indicative of 200 W/m² then there is a problem with one of the systems. This is accomplished by inferring a common metric from different measured data such that the common metric can be compared using, for example, statistical analysis.

In an embodiment, there are a number of outputs that can be measured on a solar thermal system and consequently used to infer a common metric. These outputs can include, but not limited to, electrical power output, current output, thermal energy output, temperature rise across the array, and temperature change anywhere in the system. As an example, FIG. 8 shows how the measured electrical (801) and thermal (804) power output of the system can be compared through a common metric (807), in this case implied irradiance, though other metrics could also be used.

There are a number of different methods (803) that could be used to infer irradiance (802) from measured electrical power generation (801). As an example, the efficiency of the PV cell can be used to determine the implied irradiance ($G_T$):

$$G_T = \frac{I_{mp}V_{mp}}{A_c \epsilon_{mp}}$$

where $I_{mp}$ is the maximum power point current, $V_{mp}$ is the maximum power point voltage, $A_c$ is the area of the PV array, and $\epsilon_{mp}$ is the maximum power point efficiency, which is calculated according to:

$$\epsilon_{mp} = \epsilon_{mp,ref} + \mu_{mp}(T_c - T_{c,ref})$$

where $\epsilon_{mp,ref}$ is a reference PV efficiency, given for a reference temperature $T_{c,ref}$, supplied by the manufacturer; $\mu_{mp}$ is a temperature coefficient that is also given by the manufacturer (Beckman). The temperature of the cell ($T_c$) can be determined within acceptable range, yielding a PV efficiency and, in this example, a means to inferring an irradiance from a measured production of electrical power.

Likewise, there are a number of different methods (806) that could be used to infer irradiance (805) from measured thermal power generation (804). As an example, a relationship between useful energy gain ($Q_u$) and solar irradiance (5) for a flat plate collector is:

$$Q_u = A_c F_R [S - U_L(T_i - T_a)]$$

where $A_c$ is the collector area, $T_i$ is the temperature of the fluid entering the collector, $T_a$ is the ambient air temperature (both of which can easily be measured), $F_R$ is a collector efficiency, and $U_L$ is a loss coefficient of the collector; both $F_R$ and $U_L$, can be determined based on collector design and ambient conditions (Beckman).

Once a common metric, in this case implied irradiance, has been determined a comparison can be made between the irradiance inferred from measured electrical power and the measured thermal power (807). This comparison can take many forms and will most likely, though not necessarily, take the form of a statistical analysis.

Figure 9:
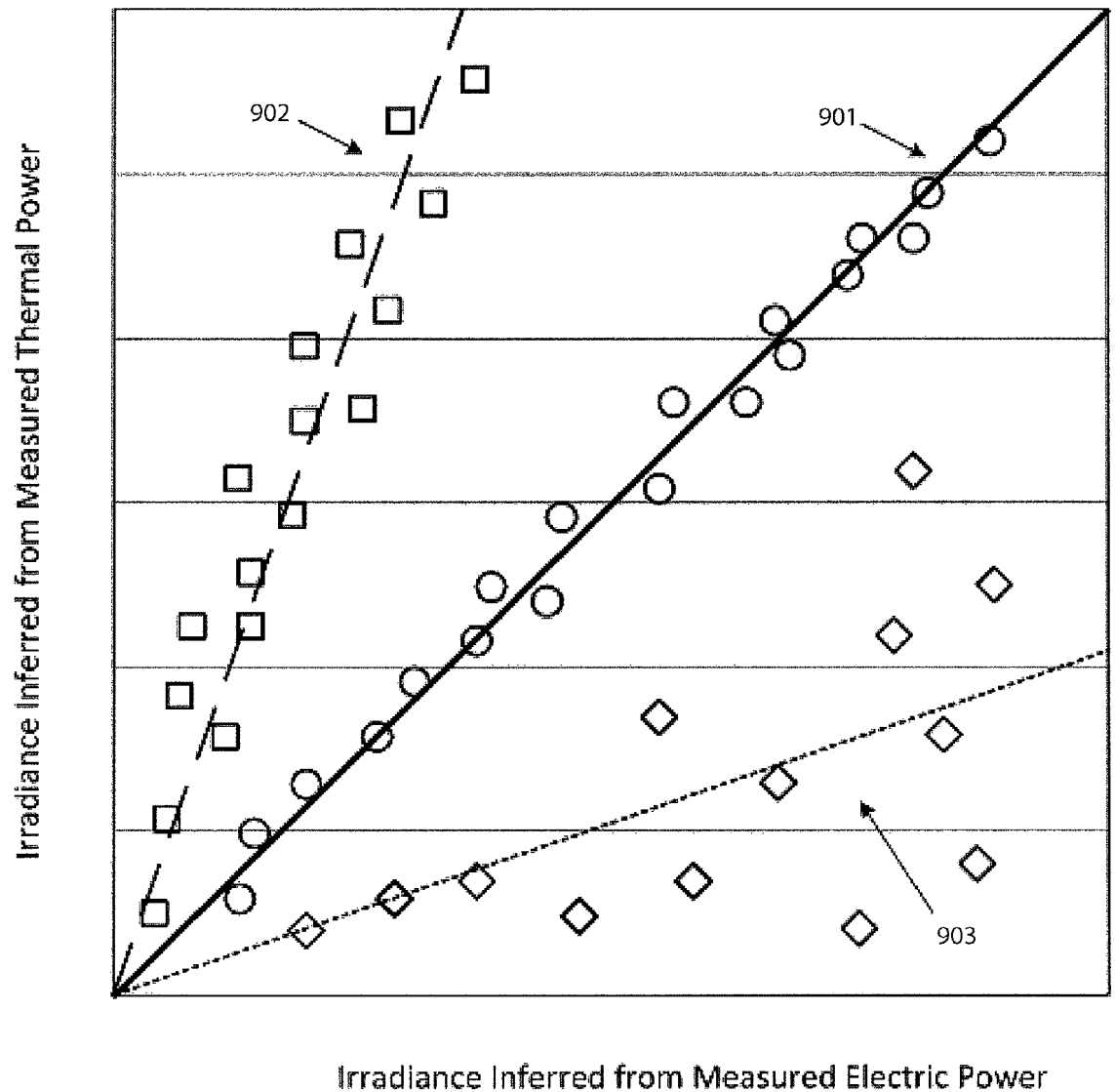
FIG. 9 is a simplified diagram illustrating a method of analyzing information from the solar thermal system according to an embodiment of the present invention.

FIG. 9 is a simplified diagram illustrating a method of analyzing information from the solar thermal system according to an embodiment of the present invention. This diagram is merely an example, which should not unduly limit the scope of the claims herein. One of ordinary skill in the art would recognize other variations, modifications, and alternatives. Once a common metric, in this case implied irradiance, has been determined a comparison can be made between the irradiance inferred from measured electrical power (801) and the measured thermal power (804) of FIG. 8. This comparison can take many forms and will most likely, though not necessarily, take the form of a statistical'analysis.

In an embodiment, the data points in FIG. 9 show the relationship between the inferred irradiance from measured electrical and thermal power. The system characterized by the circular symbols (901) shows that both measurements, when compared with a common metric, are statistically equal and the system is operating as expected. The square data points (902) represent a system that is statistically correct (i.e., there is not a significant amount of scatter in the data), but not operating correctly (or there is a problem in the application of the methodology that relates measured data to a common metric) because the relationship between the inferred irradiance from the two measured variables is not one-to-one, as it should be in this example. The diamond symbols (903) indicate a system that shows significant scatter and is not operating correctly.

FIGS. 8 and 9 show one example of how a common metric can be used to compare different measurements on a solar thermal array. The same methodology can be applied in a different way, as shown in FIG. 10.

Figure 10:
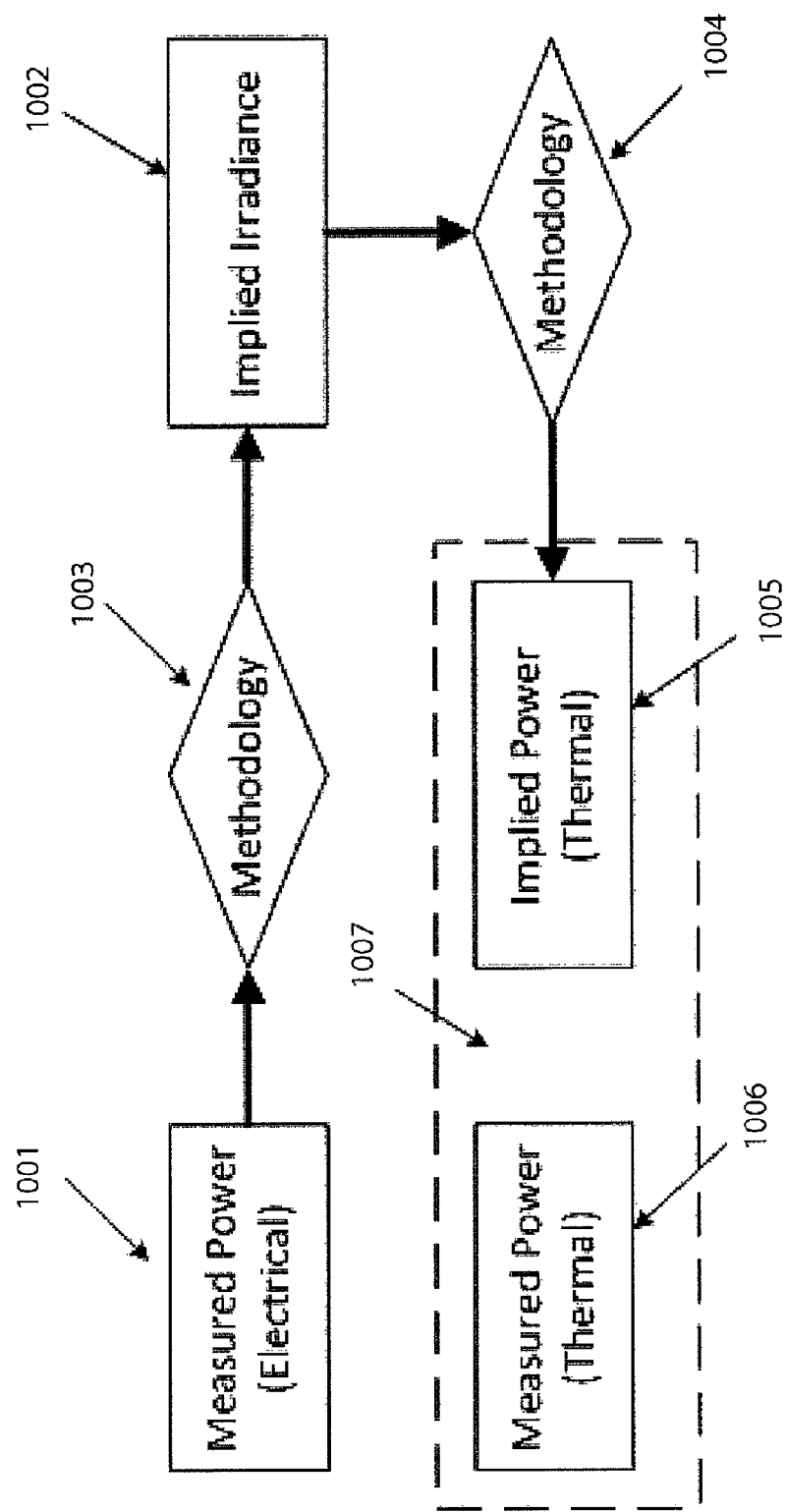
FIG. 10 is a simplified flow diagram of processing information from the solar thermal system according to another specific embodiment of the present invention.

FIG. 10 is a simplified method of processing information from the solar thermal system according to an embodiment of the present invention. This diagram is merely an example, which should not unduly limit the scope of the claims herein. One of ordinary skill in the art would recognize other variations, modifications, and alternatives. FIG. 10 uses the same logic as that shown in FIG. 8, but with the common metric of implied irradiance being used to find an implied thermal power for comparison (1007). The methodology (1003) to go from measured electrical power (1001) to implied irradiance (1002) is the same as previously discussed, with the only major difference being that the methodology that relates thermal power (either measured or implied) to irradiance (1004) is now applied in the other direction. Rather than compare implied irradiance from both measurements, the actual measured thermal power (1006) is compared to an implied thermal power (1005) that is calculated based on the implied irradiance from the measured electrical power. This merely serves to illustrate the great variety of techniques and methods that could be used to apply a common metric between different measurements to test the operating status of a solar thermal system.

Once the common metric is calculated from different measurements, a large number of analyses could be used to benchmark a system and ensure it is operating correctly. The statistical example shown in FIG. 9 is merely an example; any method that compares data within in a set (e.g., mathematically, analytically, or graphically) could be used. Again, there can be other variations, modifications, and alternatives.

Figure 11:
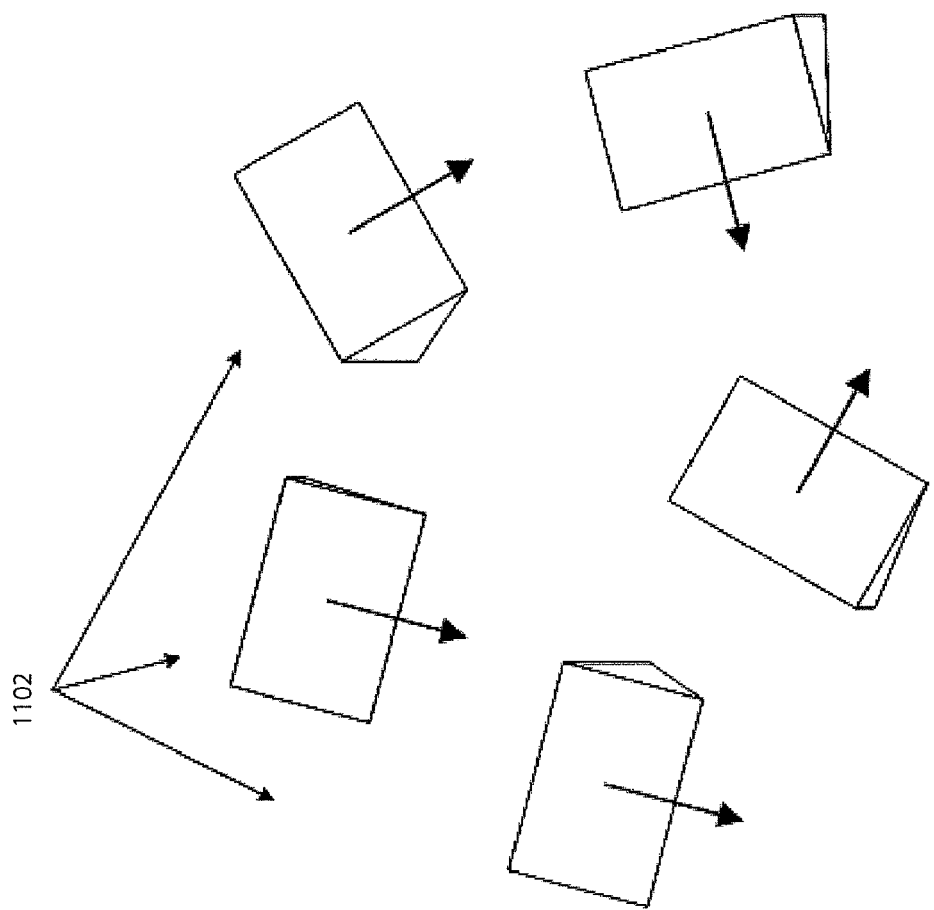
FIG. 11 is a simplified diagram of a possible spatial configuration of a plurality of solar thermal systems according to a specific embodiment of the present invention.
Figure 11:
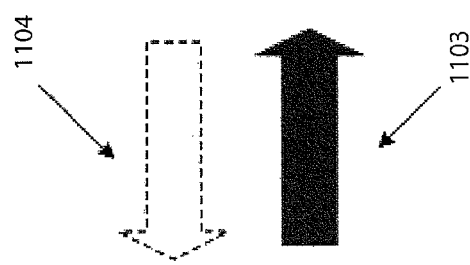
Figure 11:
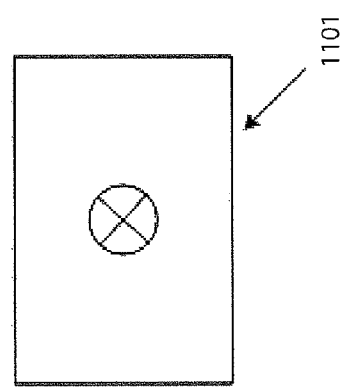

FIG. 11 is a simplified diagram of a possible spatial configuration of a plurality of solar thermal systems according to an embodiment of the present invention. This diagram is merely an example, which should not unduly limit the scope of the claims herein. One of ordinary skill in the art would recognize other variations, modifications, and alternatives. In order to ensure an individual solar system (either PV or thermal) is operating correctly, a pyranometer is required to measure the incident solar radiation. However, this expensive device is not required if there are a number of solar systems in vicinity to each other. By using the accumulation of data from the systems, an overall solar radiation (or irradiance—the two terms will be used throughout and are different ways of describing energy from the sun) for the area can be calculated and used to check each individual system to ensure it is operating correctly.

Solar radiation data are usually measured and reported in terms of total (beam+diffuse) daily or hourly radiation in a reference plane; that is, the solar radiation is measured from a device that is located on a plane of known orientation. Most typically (e.g., at weather reporting stations) this plane is horizontal, though it does not necessarily have to be. For the purposes of illustrating the concepts presented here, it will be assumed that the reference plane is horizontal and it will be referred to as such, but any common reference plane is also appropriate. Because it is necessary for solar module (either photovoltaic or thermal) analysis to know the total incident radiation on a plane with an orientation that is possibly different that than the plane on which the data was measured, a number of different theoretical, analytical, and experimental models have been developed to calculate the beam and diffuse radiation on a given surface from a given total horizontal radiation. FIG. 11 illustrates this process.

As an example, consider a weather station that records the horizontal daily radiation (1101). In order to analyze solar modules of differing orientations (1102), a model is used to calculate the amount of radiation that is incident on each individual array (1103).

It is proposed that the same mathematical models can be used in reverse (1104) to determine total horizontal radiation from measured (or inferred) tilted array radiation. By backing out the horizontal (or whichever reference plane is chosen) radiation from a number of different systems, an average horizontal solar radiation for the area can be determined and the individual arrays can be checked for consistent results. This process is shown in FIG. 12 for arrays 1 through n (the process can be applied anytime there is more than one system in vicinity, but its effectiveness increases with the number of systems in vicinity).

Figure 12:
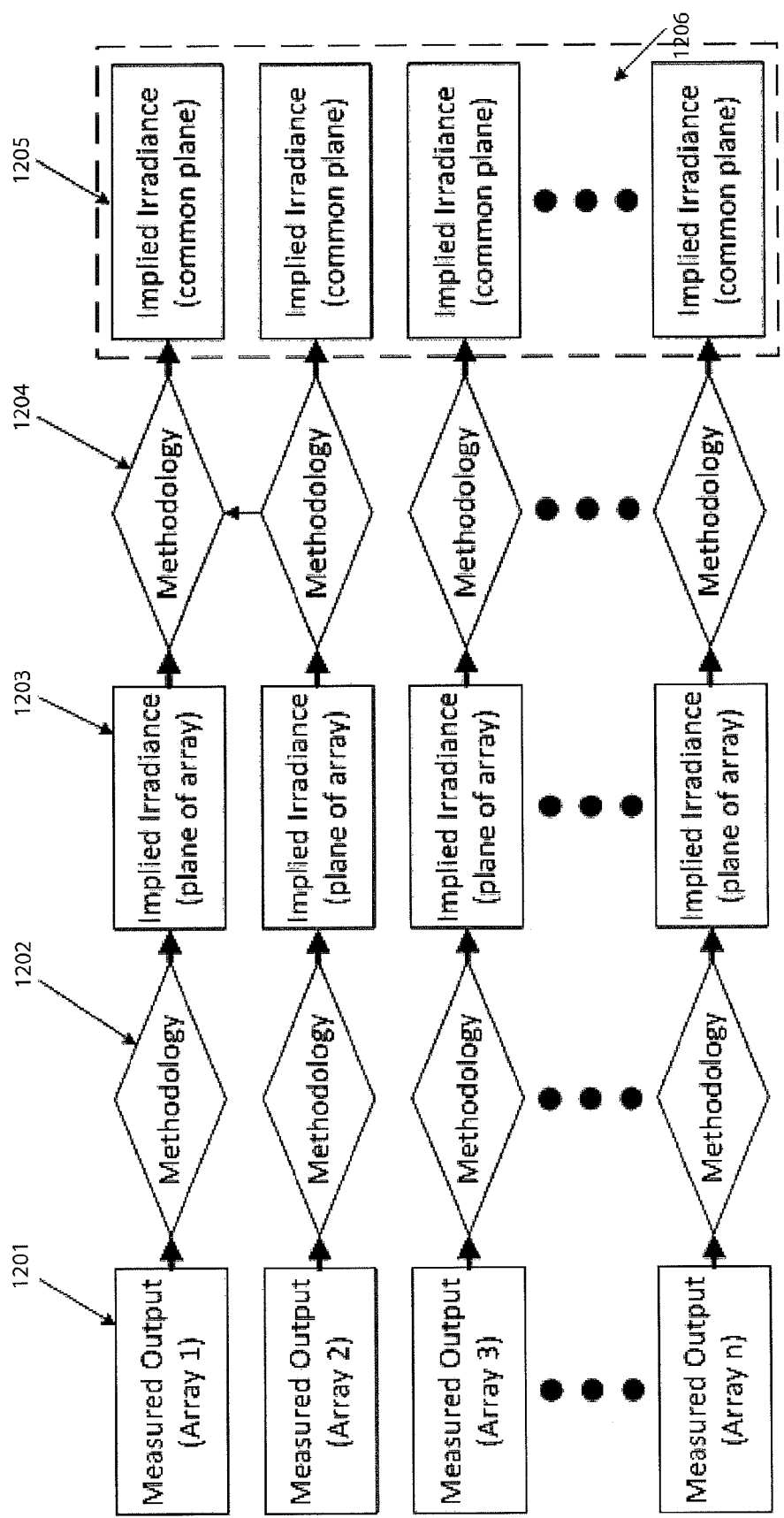
FIG. 12 is a simplified flow diagram of processing information from the solar thermal system according to yet another specific embodiment of the present invention.

FIG. 12 is a simplified method of processing information from the solar thermal system according to an embodiment of the present invention. This diagram is merely an example, which should not unduly limit the scope of the claims herein. One of ordinary skill in the art would recognize other variations, modifications, and alternatives. In FIG. 12, the measured outputs of a number of arrays (1201) are used to calculate a common metric (1203), in this case irradiance, through an acceptable methodology (1202), of which there are many. This metric is not common to all the arrays, though, as it is specific to the orientation of each array. The mathematical models that were developed to calculate the radiation incident on a given array based upon the radiation incident upon a different (usually though not necessarily horizontal) can be used (1204) to determine the implied irradiance on a common plane (1205). The collection of resulting implied irradiances (1206) can be compared and analyzed in order to determine if a system is not operating correctly.

The output of the arrays that can be measured (1201) could be a wide range of things including the thermal output, the electrical output, or the current output of the PV modules (to name a few). As an example, the electrical output of the PV modules can be converted into an implied irradiance ($G_T$) by using it efficiency:

$$G_T = \frac{I_{mp}V_{mp}}{A_c \varepsilon_{mp}}$$

where $I_{mp}$ is the maximum power point current, $V_{mp}$ is the maximum power point voltage, $A_c$ is the area of the PV array, and $\varepsilon_{mp}$ is the maximum power point efficiency, which is calculated according to:

$$\varepsilon_{mp} = \varepsilon_{mp,ref} + \mu_{mp}(T_c - T_{c,ref})$$

where $\varepsilon_{mp,ref}$ is a reference PV efficiency, given for a reference temperature $T_{c,ref}$, supplied by the manufacturer; $\mu_{mp}$ is a temperature coefficient that is also given by the manufacturer (Beckman). The temperature of the cell ($T_c$) can be determined within an acceptable range, yielding a PV efficiency and, in this example, a means to inferring an irradiance from a measured production of electrical power.

Referring again to FIG. 12, there are a number of different models (isotropic, isotropic diffuse, Hay and Davies, HDKR, and Perez, to name a few) available for deriving incident radiation on a given plane from known horizontal radiation (1204), they are similar in regards to their inputs and outputs and differ mainly on complexity and degree of accuracy. The isotropic diffuse, also known as the Liu-Jordan, model will be used here on an hourly timescale as an example of the process (Beckman).

In the isotropic diffuse model, the total incident solar radiation on an array is the sum of the beam, diffuse, and ground reflected contributions. From the location, slope, and azimuth angles of the array, as well as the date and time, the ratio of beam radiation incident on the array to horizontal beam radiation ($R_b$) can be determined:

$$R_b = \frac{\cos\theta}{\cos\theta_z}$$

where $\theta$ is the incident angle of radiation on the array and $\theta_z$ is the incident angle of radiation on a horizontal plane (Beckman).

Using a model such as the isotropic diffuse model (Beckman), the total hourly (hourly radiation is used as an example here, but isn't necessary for this benchmarking technique) radiation incident on a tilted array ($I_T$) is calculated according to:

$$I_T = I_b R_b + I_d\left(\frac{1+\cos\beta}{2}\right) + (I_b + I_d)\rho_g\left(\frac{1+\cos\beta}{2}\right)$$

where $I_b$ and $I_d$ are the beam and diffuse components (respectively) of the horizontal solar radiation, $\beta$ is the array slope, and $\rho_g$ is a constant that describes the reflection of solar radiation from the ground and surroundings. Additionally, the Erbs correlation (Beckman) is used to calculate the diffuse radiation incident on the tilted array; knowing the ratio of the total incident radiation on the array to the extraterrestrial radiation yields the ratio of the diffuse incident radiation to the total incident radiation.

$$\frac{(I_b + I_d)}{I_b} \xrightarrow{yields} \frac{I_d}{(I_b + I_d)}$$

The known variables for these two equations are (for this example): $I_T$ (from measured electrical production), $R_b$, $\beta$, and $I_o$. This leaves three unknowns: $I_b$, $I_d$, and $\rho_g$. The ground reflectance is dependent on, among other things, location (e.g., rural versus urban landscapes) and ground cover (e.g., snow cover increases reflectance). Although the exact value for $\rho_g$ will be different for each array, it does not have a large effect on the calculated horizontal radiation and an acceptable estimate can be made based upon location and season. There are now two equations and two unknowns, which can be solved for each array, and a collection of implied irradiances are available, supplying a common metric to be analyzed, typically (but not necessarily) using statistical methods.

Figure 13:
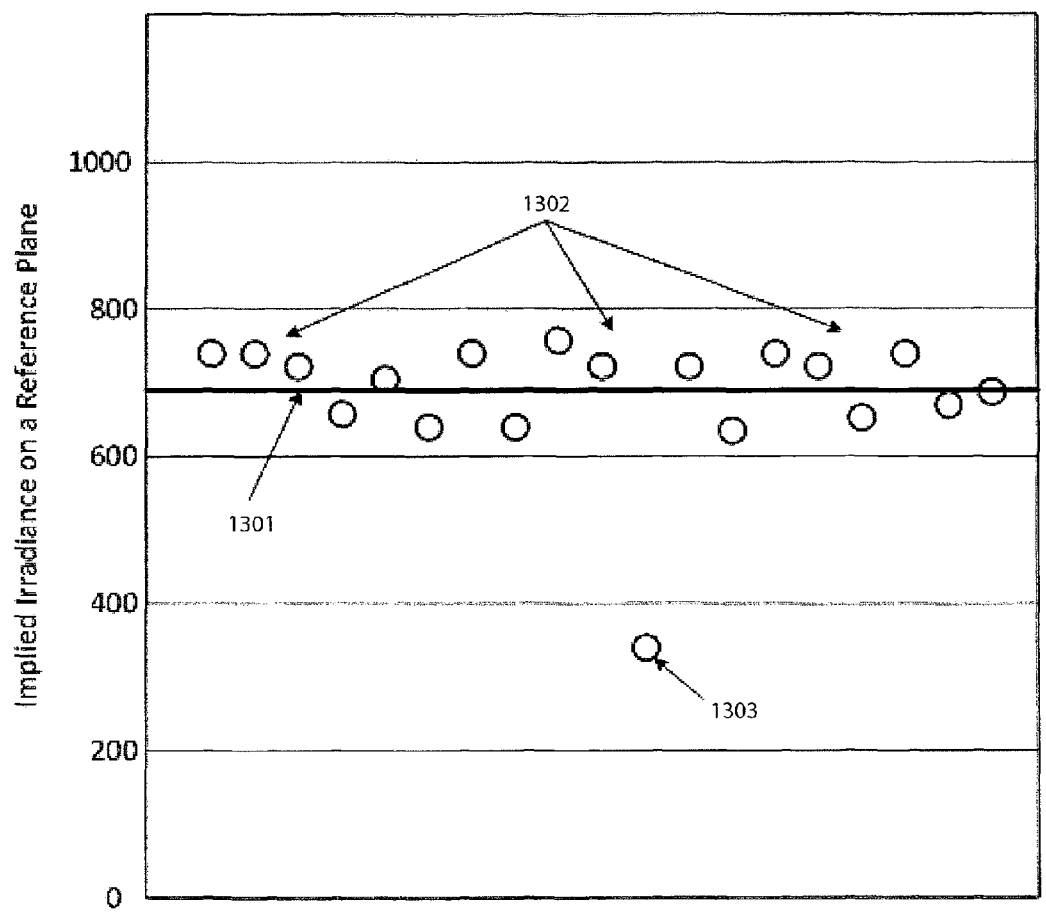
FIG. 13 is a simplified diagram illustrating a method of analyzing information from the solar thermal system according to an embodiment of the present invention.

As an example of simple statistically analysis that could be applied to the collection of horizontal radiation calculated from the different arrays in an area, FIG. 13 shows a simple averaging of all the common metric, in this case implied irradiance on a reference plane.

FIG. 13 is a simplified diagram illustrating a method of analyzing information from the solar thermal system according to an embodiment of the present invention. This diagram is merely an example, which should not unduly limit the scope of the claims herein. One of ordinary skill in the art would recognize other variations, modifications, and alternatives. For this example, an average implied irradiance (1301) is calculated from a number of individual implied irradiances (1302). Any extreme outliers (1303) indicate a system that is not operating correctly.

Figure 14:
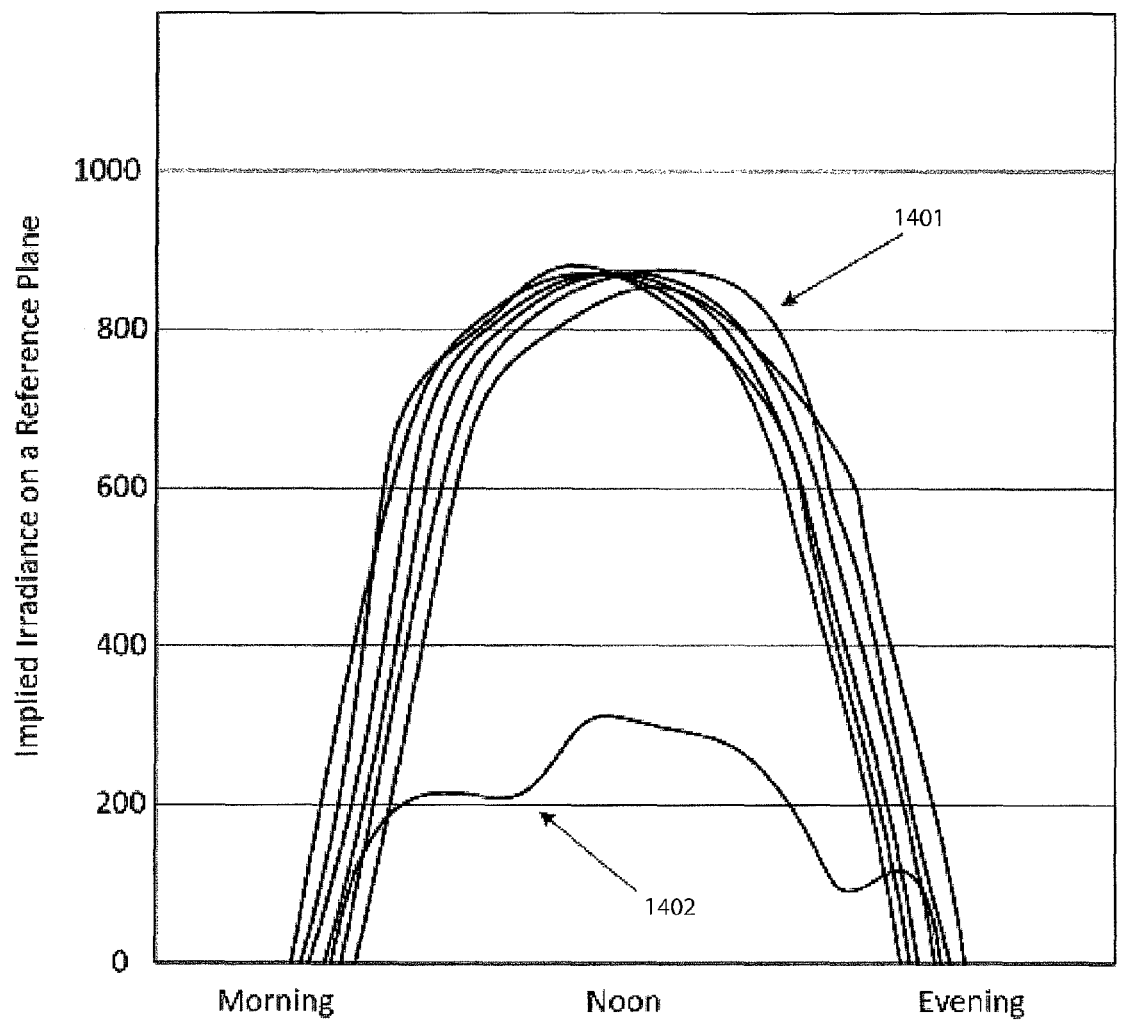
FIG. 14 is a simplified diagram illustrating a method of analyzing information from the solar thermal system according to an embodiment of the present invention.

Another way of looking at the data shown in FIG. 13 would be to plot the daily implied irradiance on a reference plane for each of the arrays; this is shown in FIG. 14.

FIG. 14 is a simplified diagram illustrating a method of analyzing information from the solar thermal system according to an embodiment of the present invention. This diagram is merely an example, which should not unduly limit the scope of the claims herein. One of ordinary skill in the art would recognize other variations, modifications, and alternatives. For this example, the arrays producing similar curves (1401) would be operating correctly, while the very different curve (1402) would imply the system that produced that curve was not operating correctly.

FIGS. 12, 13, and 14 show one example of using a common metric on a reference plane to compare various solar thermal (or just PV or just Thermal) modules that are in vicinity to each other. Note that this methodology does not necessarily need to follow the flowchart shown in FIG. 12. It is also possible to use the common metric on a reference plane to derive an inferred output on the plane of a particular array to compare it directly with a measured output. In other words, the methodology shown in FIGS. 12 (1202 and 1204) need not go the direction shown, and could be used to go from an implied common metric on a reference plane to an implied measurement on a specific plane (in order for comparison to a measured output). FIG. 12 shows a straightforward example of this concept, but more complex flowcharts are also possible. In general, a common metric on a reference plane is used to compare (different) measurements on arrays of different orientation, but it is not necessarily the common metric on the reference plane that is compared; it can merely be an intermediate step to get to a different metric that can be compared between the systems One thing to note: This technique does not have to rely solely on measurements taken from the various arrays. Other sources could be used to contribute to an average horizontal irradiance (or any common metric on a reference plane) such as the output from a nearby pyranometer, nearby weather station data, or even theoretical models for radiation such as the clear-sky radiation prediction outlined below.

It is also understood that the examples and embodiments described herein are for illustrative purposes only and that various modifications or changes in light thereof will be suggested to persons skilled in the art and are to be included within the spirit and purview of this application and scope of the appended claims.

Figure 15:
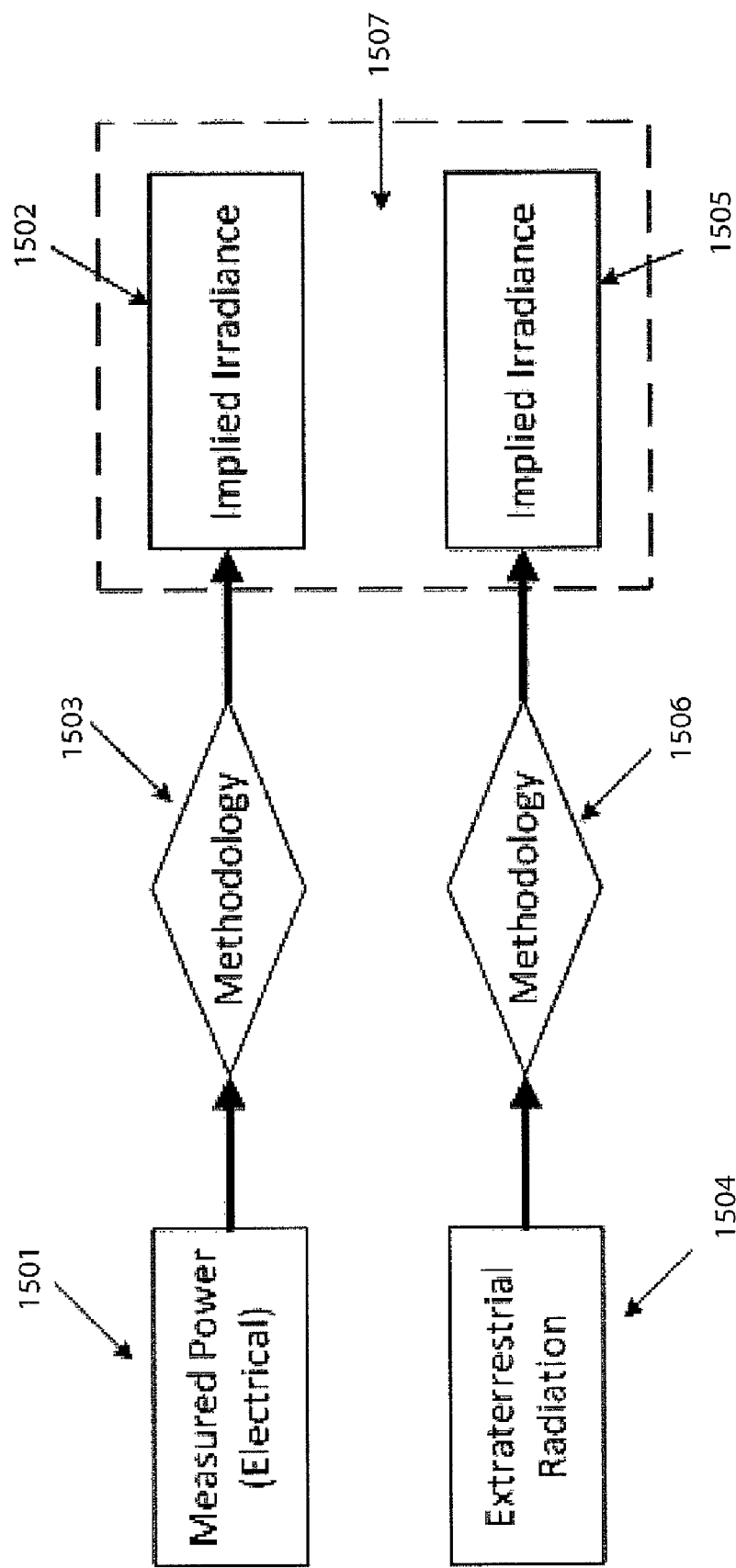
FIG. 15 is a simplified flow diagram of processing information from the solar thermal system according to yet another specific embodiment of the present invention.

FIG. 15 is a simplified method of processing information from the solar thermal system according to an embodiment of the present invention. This diagram is merely an example, which should not unduly limit the scope of the claims herein. One of ordinary skill in the art would recognize other variations, modifications, and alternatives. It is well documented that the amount of extraterrestrial (i.e., before scattering and absorption in the atmosphere) solar radiation that reaches the Earth is 1367 W/m². Knowing this, methods have been developed to estimate the clear-sky (i.e., no clouds present in the atmosphere) beam and diffuse radiation that reaches an array. These theoretical models can be used to build a prediction of solar intensity (i.e., radiation) on a clear-sky day to benchmark a system based on its location (latitude, longitude, and altitude), orientation (slope and azimuth), day of the year, and climate by comparing the predicted solar radiation from the clear-sky assumption with a radiation (or irradiance, the terms are used interchangeably here) implied from a measured output, which could be electrical power generation, thermal power generation, or current output from the array (to name only a few). An example of this process is shown in FIG. 15.

In an embodiment, the measured electrical power (1501) is used to determine the implied irradiance (1502) based on a methodology or transfer function (1503). And implied irradiance (1505) is determined from a known extraterrestrial radiation (1504) using any one of a number of analytical, experimental, or theoretical methods (1506). The end result is a common metric (1507) that can be used to benchmark the system.

There are a number of different methods (1503) that could be used to infer irradiance (802) from measured electrical power generation (1501). As an example, the efficiency of the PV cell can be used to determine the implied irradiance ($G_T$):

$$G_T = \frac{I_{mp} V_{mp}}{A_c \varepsilon_{mp}}$$

where $I_{mp}$ is the maximum power point current, $V_{mp}$ is the maximum power point voltage, $A_c$ is the area of the PV array, and $\varepsilon_{mp}$ is the maximum power point efficiency, which is calculated according to:

$$\varepsilon_{mp} = \varepsilon_{mp,ref} + \mu_{mp}(T_c - T_{c,ref})$$

where $\varepsilon_{mp,ref}$ is a reference PV efficiency, given for a reference temperature $T_{c,ref}$, supplied by the manufacturer; $\mu_{mp}$ is a temperature coefficient that is also given by the manufacturer (Beckman). The temperature of the cell ($T_c$) can be determined within an acceptable range, yielding a PV efficiency and, in this example, a means to inferring an irradiance from a measured production of electrical power.

In order to infer implied irradiance (1505) from extraterrestrial radiation (1504), a number of different models (1506) exist to predict the absorption and scattering of solar radiation in the atmosphere. As more data becomes available these models will continue to evolve and improve, but the general methodology will remain similar. In order to provide a concrete example of the process being proposed, methods for calculating beam radiation (Hottel, 1976) and diffuse radiation (Liu and Jordan, 1976) transmitted though the atmosphere are combined to determine clear-sky solar radiation.

According to Hottel, the atmospheric transmittance of beam radiation is ($\tau_b$) is:

$$\tau_b = \frac{G_{bn}}{G_{on}} = a_0 + a_1 \exp\left(\frac{-k}{\cos\theta_z}\right)$$

where $G_{bn}$ is the beam radiation normal to the direction of propagation, $G_{on}$ is the extraterrestrial radiation normal to the direction of propagation, and $\theta_z$ is the zenith angle (the angle of incidence between the sun and a horizontal surface). The constants $a_0$, $a_1$, and k are determined experimentally and are found (for altitudes less than 2.5 km) from:

$$a*_o = 0.4237 - 0.0821(6-A)^2$$

$$a*_1 = 0.5055 + 0.00595(6.5-A)^2$$

$$k* = 0.2711 + 0.01858(2.5-A)^2$$

where A is the altitude of the array in kilometers. In order to account for different climate times, correction factors are applied:

$$r_0 = \frac{a_0}{a_0^*}, r_1 = \frac{a_1}{a_1^*}, r_k = \frac{k}{k^*}$$

where $r_0$, $r_1$, and $r_k$ are constants depending on the climate type, which are determined based on experimental data and are available for a number of different climates. In this example, a mid-altitude summer climate is assumed, which yields values of $r_0$, $r_1$, and $r_k$ of 0.97, 0.99, and 1.02, respectively. One of ordinary skill in the art would recognize other variations, modifications, and alternatives.

The value for extraterrestrial radiation normal to its propagation (GA can be calculated with varying degrees of accuracy. A simple equation is:

$$G_{on} = G_{sc}\left(1 + 0.033 \cos\frac{360n}{365}\right)$$

where $G_{sc}$ is the solar constant (1367 W/m²) and n is the day of the year (1 through 365). It then follows that the clear-sky horizontal beam radiation ($G_{cb}$) is calculated according to:

$$G_{cb} = G_{on} \tau_b \cos\theta_z$$

Besides the clear-sky beam radiation incident on a horizontal surface, the clear-sky diffuse component of radiation must be calculated (for this example). The relationship between the beam ($\tau_b$) and diffuse ($\tau_d$) transmission coefficient is currently empirical and therefore will change and improve as more data is accumulated. However, an acceptable relationship, developed by Liu and Jordan (1960), is:

$$\tau_d = 0.271 - 0.294\tau_b$$

In order to calculate the incident solar radiation on a tilted array it is necessary to keep the beam and diffuse components of the horizontal radiation separate. However, for reference to measured data it is useful to calculate the total clear-sky radiation incident on a horizontal surface ($G_c$):

$$G_c = G_{cb} + G_{cd} = G_{on}\tau_b \cos\theta_z + G_{on}\tau_d \cos\theta_z$$

which simplifies to:

$$G_c = (\tau_b + \tau_d)G_{on}\cos\theta_z$$

Knowing the beam and diffuse components of the clear-sky radiation on a horizontal surface, it is possible to determine the amount of solar radiation incident on a particular array. For this example, the isotropic diffuse model will be used, though many exist and would work also.

In the isotropic diffuse model, the total incident solar radiation on an array is the sum of the beam, diffuse, and ground reflected contributions. From the location, slope, and azimuth angle of the array, as well as the date and time, the ratio of beam radiation incident on the array to horizontal beam radiation ($R_b$) can be determined:

$$R_b = \frac{\cos\theta}{\cos\theta_z}$$

where $\theta$ is the incident angle of radiation on the array and $\theta_z$ is the incident angle of radiation on a horizontal plane (Beckman).

Using a model such as the isotropic diffuse model (Beckman), the total radiation incident on a tilted array ($I_T$) is calculated according to:

$$I_T = I_b R_b + \frac{I_d(1+\cos\beta)}{2} + (I_b + I_d)\rho_g \frac{(1+\cos\beta)}{2}$$

where $I_b$ and $I_d$ are the beam and diffuse components (respectively) of the horizontal solar radiation, $\beta$ is the array slope, and $\rho_g$ is a constant that describes the reflection of solar radiation from the ground and surroundings.

The common metric of inferred irradiation can be compared between the measured system and the theoretical clear-sky. Because of the assumption that the sky is clear (i.e., no clouds are present), it is most appropriate (though not absolutely necessary) to apply the clear-sky benchmarking technique on clear days. One possible method for determining the confidence level of the technique (i.e., if the sky is completely clear that day then the clear-sky assumption is more appropriate than on a cloudy day) is to determine whether or not a day is clear by examining the daily output of one of the measurements. For example, the thermal energy production for a clear day should be a smooth curve, as shown in FIG. 16.

Figure 16:
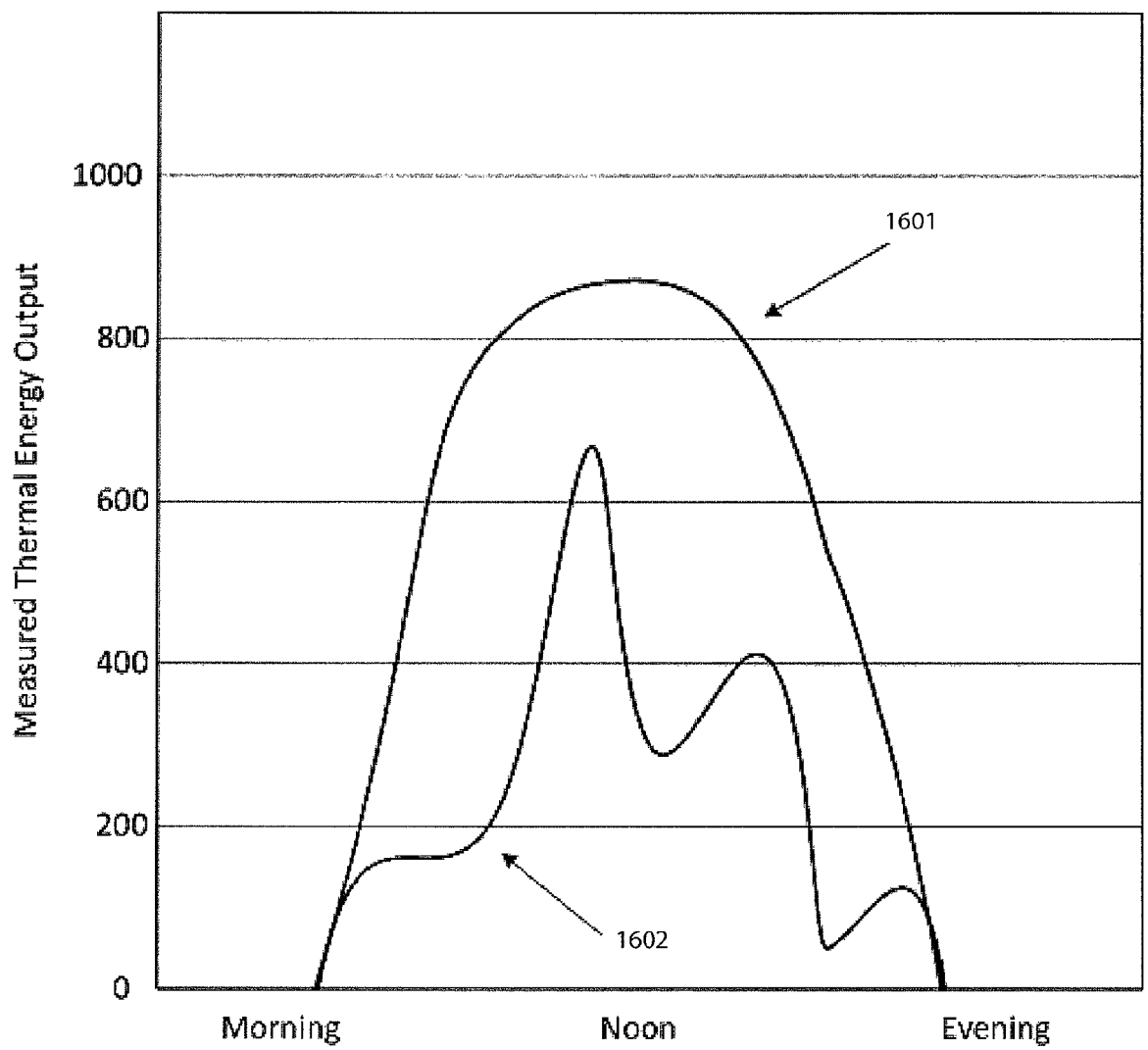
FIG. 16 is a simplified diagram illustrating a method of analyzing information from the solar thermal system according to an embodiment of the present invention.

FIG. 16 is a simplified diagram illustrating a method of analyzing information from the solar thermal system according to an embodiment of the present invention. This diagram is merely an example, which should not unduly limit the scope of the claims herein. One of ordinary skill in the art would recognize other variations, modifications, and alternatives. The temperature rise across the array (during a period of constant airflow through the array) can be examined at the conclusion of the day. On a clear day, the energy production (1601) will be a smooth curve with a maximum value around solar noon. On a cloudy day, the energy production will not be constant (1602).

Once an appropriately clear day is selected for analysis and the clear-sky radiation incident on the tilted array has been calculated, statistically methods can be used to benchmark the system and ensure it is operating correctly. One example (there are many possible analysis methods) would be to compare the inferred radiation from a measurement (for this example electrical power output) to the calculated clear-sky radiation on the array, as shown in FIG. 17.

Figure 17:
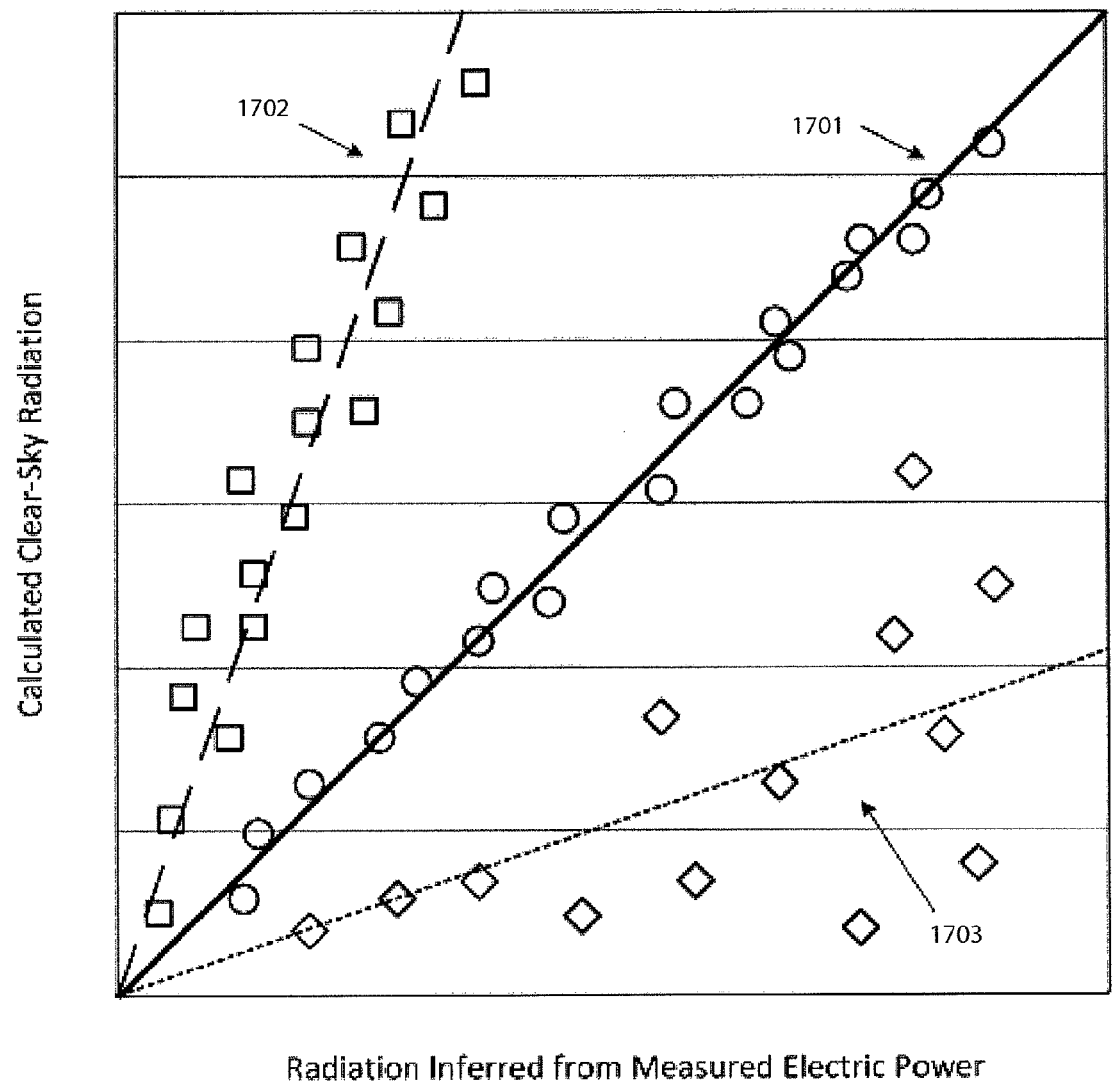
FIG. 17 is a simplified diagram illustrating a method of analyzing information from the solar thermal system according to an embodiment of the present invention.

FIG. 17 is a simplified diagram illustrating a method of analyzing information from the solar thermal system according to an embodiment of the present invention. This diagram is merely an example, which should not unduly limit the scope of the claims herein. One of ordinary skill in the art would recognize other variations, modifications, and alternatives. The data points in FIG. 17 show the relationship between the inferred irradiance from measured electrical power and the calculated clear-sky radiation. The system characterized by the circular symbols (1701) shows that both values are very similar and the system is operating as expected. The square data points (1702) represent a system that is statistically correct (i.e., there is not a significant amount of scatter in the data), but not operating correctly (or there is a problem in the application of the methodology) because the relationship between the inferred irradiance from the measured output and the clear-sky predication is not one-to-one, as it should be in this example. The diamond symbols (1703) indicate a system that shows significant scatter and is not operating correctly.

The above example illustrated with FIGS. 15 through 17 shows one possible way that clear-sky predictions of radiation could be used. As another example, the clear-sky radiation could be used to predict a measured output which could also be compared, as shown in FIG. 18.

Figure 18:
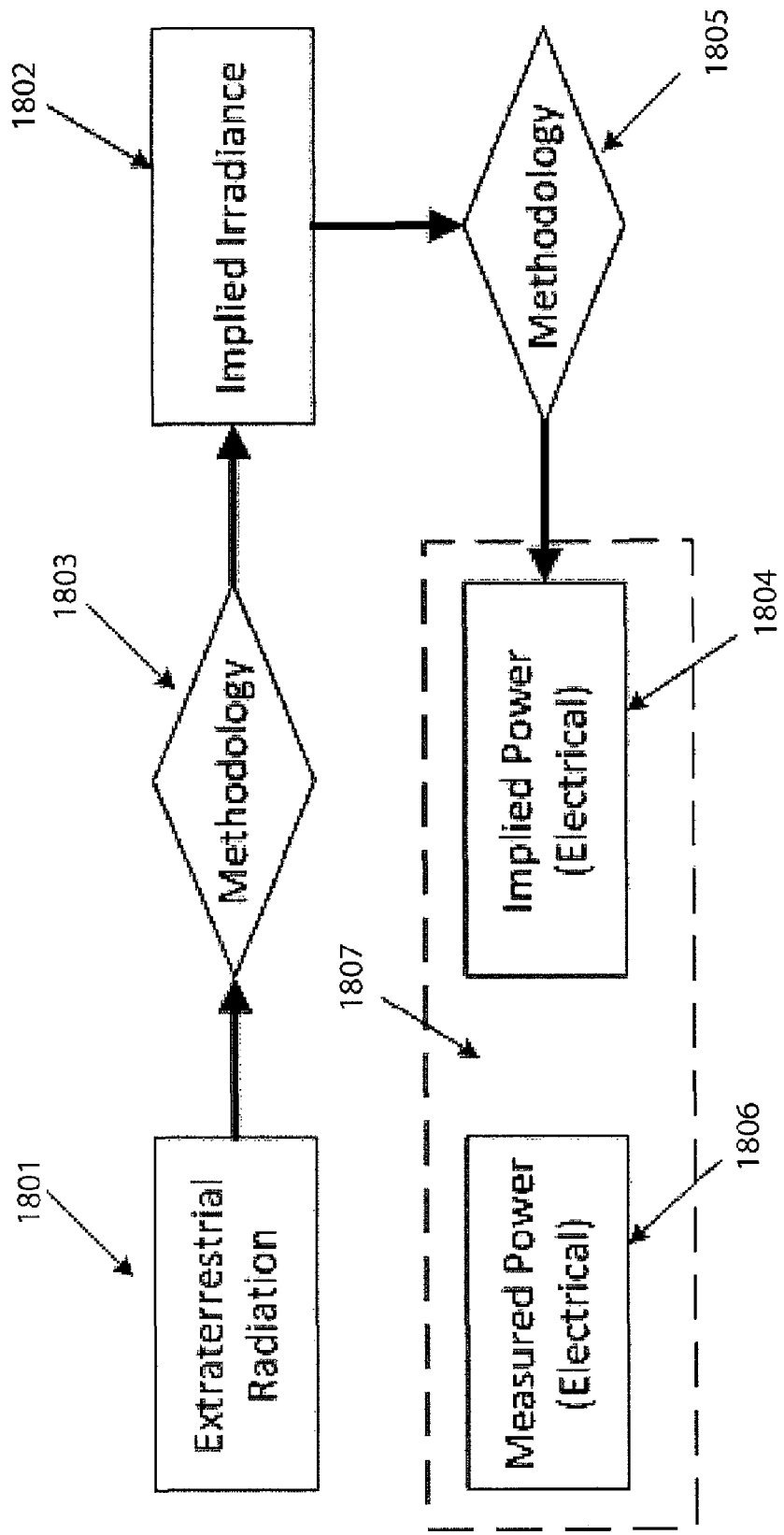
FIG. 18 is a simplified flow diagram of processing information from the solar thermal system according to yet another specific embodiment of the present invention.

FIG. 18 is a simplified flow diagram of processing information from the solar thermal system according to an embodiment of the present invention. This diagram is merely an example, which should not unduly limit the scope of the claims herein. One of ordinary skill in the art would recognize other variations, modifications, and alternatives. In FIG. 18, the extraterrestrial radiation (1801) is used to calculate an incident irradiance on an array (1802) using any number of different transfer functions (1803). This implied irradiance is used to calculate an implied electrical power generation (1804) via an appropriate methodology (1805). The implied electrical power (1804) and measured electrical power (1806) can be compared (1807) to ensure the system is operating correctly. Again there can be other alternatives, modifications, and variations.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for operating a solar thermal system, the method comprising:

providing a photovoltaic apparatus comprising a first electrical member and a second electrical member;

providing a solar thermal apparatus coupled to the photovoltaic apparatus, the solar thermal apparatus comprising flow region having a first measurement region and a second measurement region, the first measurement region being configured by a spatial distance to the second measurement region;

providing a controller coupled with both the photovoltaic apparatus and the solar thermal apparatus, the controller comprising a non-transitory computer readable medium containing one or more computer instructions stored therein;

capturing electrical information associated with operation of the photovoltaic apparatus using the controller, the electrical information being derived from the first electrical member and the second electrical member;

capturing thermal information associated with operation of the solar thermal apparatus using the controller, the thermal information being derived from the first measurement region and the second measurement region;

processing the electrical information using the one or more computer instructions to associate the electrical information against one or more electrical parameters in a common metric;

processing the thermal information using the one or more computer instructions to associate the thermal information against one or more thermal parameters in the common metric;

validating the electrical information against the one or more electrical parameters using the one or more computer instructions for statistical analysis of the common metric;

validating the thermal information against the one or more thermal parameters using the one or more computer instructions for statistical analysis of the common metric; and using the validated thermal information and/or the validated electrical information to detect failure or inconsistency of operations of the photovoltaic apparatus and/or the solar thermal apparatus.

2. The method of claim 1 wherein the validating of the electrical information associates the electrical information with a stand-alone energy meter.

3. The method of claim 1 wherein the validating of the thermal information associates the thermal information with one or more standard processes.

4. The method of claim 1 further comprising using the validated thermal information and/or the validated electrical information to receive monetary compensation.

5. The method of claim 1 wherein the processing of the thermal information and the processing of the electrical information associates the thermal information to the electrical information using the one or more computer instructions to infer a common metric from measured thermal power and measured electric power and further outputs a power correlation associated with the photovoltaic apparatus and the solar thermal apparatus for a determined time.

6. The method of claim 5 wherein the validating of the thermal information outputs the power correlation to determine if the solar thermal apparatus works correctly.

7. The method of claim 1 wherein the processing of the thermal information and the processing of the electrical information associates the thermal information to the electrical information using the one or more computer instructions to infer a common metric from calculated clear-sky radiation and measured electric power and further outputs an energy correlation associated with the photovoltaic apparatus and the solar thermal apparatus.

8. The method of claim 1 wherein the one or more thermal parameters comprises one or more electrical parameters.

9. The method of claim 1 wherein the one or more electrical parameters comprises one or more thermal parameters.

10. The method of claim 1 wherein the first region comprises a third region and a fourth region and the second region comprises a fifth region and a sixth region.

11. A method for operating a solar thermal system, the method comprising:

providing a photovoltaic apparatus coupled to a solar thermal apparatus, the solar thermal apparatus comprising flow region having a first measurement region and a second measurement region, the first measurement region being configured by a spatial distance to the second measurement region;

coupling a controller device to the photovoltaic apparatus and the solar thermal apparatus, the controller device comprising a non-transitory computer readable medium contained one or more computer instructions stored therein;

receiving electrical information associated with operation of the photovoltaic apparatus by the controller device;

receiving thermal information associated with operation of the solar thermal apparatus by the controller device, the thermal information being derived from the first measurement region and the second measurement region;

processing the electrical information using the one or more computer instructions to associate the electrical information against one or more electrical parameters to infer a common metric;

processing the thermal information using the one or more computer instructions to associate the thermal information against one or more thermal parameters to infer the common metric;

associating the one or more thermal parameters with the one or more electrical parameters through a statistical analysis using the common metric to determine a state of the solar thermal apparatus; and using the state of the solar thermal apparatus to generate computer instructions stored in the non-transitory computer readable medium for operations of the photovoltaic apparatus and the solar thermal apparatus.

12. The method of claim 11 wherein the state is selected from a broken state, a maintenance state, or a good state.

13. The method of claim 11 wherein the one or more thermal parameters is selected from current information, resistivity information, or voltage information as read from a thermal measurement device comprising a resistance temperature detector, thermocouple, thermopile, thermistor, infrared detector, or any other suitable temperature measurement device.

14. The method of claim 11 wherein the one or more electrical parameters is selected from current information, resistivity information, voltage information, magnetic field intensity or location, or any other suitable electrical measurement device.

15. The method of claim 11 wherein the electrical information is selected from a current, a voltage, or any other suitable electrical parameter.

16. The method of claim 11 wherein the thermal information is selected from a current, a voltage, a flow measurement, or any other suitable thermal parameter.

17. The method of claim 11 wherein the thermal information is a difference in temperature between the first measurement region and the second measurement region.

18. A system for operating a solar thermal system comprising:

a photovoltaic apparatus coupled to a solar thermal apparatus, the solar thermal apparatus comprising flow region having a first measurement region and a second measurement region, the first measurement region being configured by a spatial distance to the second measurement region;

a controller device having non-transitory computer readable medium, the non-transitory computer readable medium comprising:

one or more instructions directed to receiving electrical information associated with operation of the photovoltaic apparatus;

one or more instructions directed to receiving thermal information associated with operation of the solar thermal apparatus, the thermal information being derived from the first measurement region and the second measurement region;

one or more instructions directed to processing the electrical information and associating the electrical information against one or more electrical parameters;

one or more instructions directed to processing the thermal information and associating the thermal information against one or more thermal parameters; and one or more instructions directed to associating the one or more thermal parameters with the one or more electrical parameters to determine a state of the solar thermal apparatus.

19. A method for operating a solar thermal system, the method comprising:

providing a photovoltaic apparatus comprising a first electrical member and a second electrical member in a first geographic location;

providing a solar thermal apparatus at a second geographic location, the solar thermal apparatus comprising flow region having a first measurement region and a second measurement region, the first measurement region being configured by a spatial distance to the second measurement region;

providing a controller comprising an interface module and a control module, the interface module being configured to communicate with the photovoltaic apparatus in the first geographic location and the solar thermal apparatus in the second geographic location;

capturing electrical information associated with operation of the photovoltaic apparatus by the controller through the interface module, the electrical information being derived from the first electrical member and the second electrical member;

capturing thermal information associated with operation of the solar thermal apparatus by the controller through the interface module, the thermal information being derived from the first measurement region and the second measurement region;

processing the electrical information and associating the electrical information against one or more electrical parameters in a common metric using the control module to output a first correlation associated with the photovoltaic apparatus and the solar thermal apparatus using the interface module;

processing the thermal information and associating the thermal information against one or more thermal parameters in the common metric using the control module to output a second correlation associated with the photovoltaic apparatus and the solar thermal apparatus using the control module using the interface module;

validating the electrical information against the one or more electrical parameters to determine an operation status associated with the photovoltaic apparatus based on the first correlation; and validating the thermal information against the one or more thermal parameters to determine an operation status associated with the solar thermal apparatus based on the second correlation.

20. A method for operating a solar thermal system, the method comprising:

providing a solar thermal apparatus, the solar thermal apparatus comprising flow region having a first measurement region and a second measurement region, the first measurement region being configured by a spatial distance to the second measurement region;

coupling a controller to the solar thermal apparatus, the controller being configured to perform data communication with both the first measurement region and the second measurement region;

capturing thermal information associated with operation of the solar thermal apparatus using the controller, the thermal information being derived from the first measurement region and the second measurement region;

processing the thermal information and associating the thermal information against one or more thermal parameters in a common metric for statistical analysis to output a correlation;

validating the thermal information against the one or more thermal parameters to determine an operation state of the solar thermal apparatus based on the correlation.

21. The method of claim 20 wherein the one or more thermal parameters comprises clear sky data.

* * * * *